United States Patent
Ogikubo

(10) Patent No.: US 10,203,824 B2
(45) Date of Patent: Feb. 12, 2019

(54) CAPACITIVE TOUCH PANEL

(71) Applicant: FUJIFILM Corporation, Tokyo (JP)

(72) Inventor: Shinya Ogikubo, Kanagawa (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 53 days.

(21) Appl. No.: 15/402,721

(22) Filed: Jan. 10, 2017

(65) Prior Publication Data

US 2017/0115780 A1    Apr. 27, 2017

Related U.S. Application Data

(63) Continuation of application No. PCT/JP2015/067753, filed on Jun. 19, 2015.

(30) Foreign Application Priority Data

Jul. 16, 2014  (JP) ................................. 2014-145827

(51) Int. Cl.
*G06F 3/045* (2006.01)
*G06F 3/041* (2006.01)
(Continued)

(52) U.S. Cl.
CPC .............. *G06F 3/044* (2013.01); *B32B 3/08* (2013.01); *B32B 7/12* (2013.01); *B32B 23/20* (2013.01); *B32B 27/08* (2013.01); *B32B 27/281* (2013.01); *B32B 27/30* (2013.01); *B32B 27/302* (2013.01); *B32B 27/306* (2013.01);
(Continued)

(58) Field of Classification Search
CPC ....................................................... G06F 3/044
See application file for complete search history.

(56) References Cited

U.S. PATENT DOCUMENTS

| | | | |
|---|---|---|---|
| 2012/0157611 A1 | 6/2012 | Katami et al. | |
| 2014/0065417 A1* | 3/2014 | Higashi ................ | C09J 133/066 428/355 AC |
| 2014/0290849 A1* | 10/2014 | Hayashi ................ | G02F 1/1335 156/273.5 |

FOREIGN PATENT DOCUMENTS

| | | |
|---|---|---|
| JP | 2008-310551 A | 12/2008 |
| JP | 2012-140605 A | 7/2012 |

(Continued)

OTHER PUBLICATIONS

Communication dated Aug. 8, 2017, from the Japanese Patent Office in counterpart Japanese application No. 2016-534338.

(Continued)

*Primary Examiner* — Nan-Ying Yang
(74) *Attorney, Agent, or Firm* — Sughrue Mion, PLLC

(57) ABSTRACT

The present invention provides a capacitive touch panel in which malfunction hardly occurs even when an operation is performed after a finger of an operator touches the capacitive touch panel for a long period of time in an ordinary temperature. The capacitive touch panel according to the invention is a capacitive touch panel comprising: a display device; a lower pressure sensitive adhesive layer; a capacitive touch panel sensor; an upper pressure sensitive adhesive layer; and a protective substrate, in this order, in which temperature dependence of a relative dielectric constant of the upper pressure sensitive adhesive layer which is obtained by a temperature dependency evaluation test described below is 10.0% or less.

20 Claims, 4 Drawing Sheets

(51) Int. Cl.
  *G06F 3/044*   (2006.01)
  *C09J 201/00*   (2006.01)
  *B32B 7/12*   (2006.01)
  *B32B 23/20*   (2006.01)
  *B32B 27/08*   (2006.01)
  *B32B 27/28*   (2006.01)
  *B32B 27/30*   (2006.01)
  *B32B 27/32*   (2006.01)
  *B32B 27/34*   (2006.01)
  *B32B 27/36*   (2006.01)
  *B32B 3/08*   (2006.01)

(52) U.S. Cl.
  CPC ............ *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *C09J 201/00* (2013.01); *G06F 3/041* (2013.01); *G06F 3/045* (2013.01); *B32B 2250/44* (2013.01); *B32B 2255/10* (2013.01); *B32B 2255/26* (2013.01); *B32B 2307/20* (2013.01); *B32B 2307/206* (2013.01); *B32B 2307/412* (2013.01); *B32B 2307/42* (2013.01); *B32B 2307/558* (2013.01); *B32B 2307/732* (2013.01); *B32B 2457/208* (2013.01); *G06F 2203/04103* (2013.01); *G06F 2203/04112* (2013.01)

(56) References Cited

FOREIGN PATENT DOCUMENTS

| | | |
|---|---|---|
| JP | 2012-246477 A | 12/2012 |
| JP | 2013-196551 A | 9/2013 |
| WO | 2014/091769 A1 | 6/2014 |

OTHER PUBLICATIONS

International Search Report for PCT/JP2015/067753 dated Sep. 1, 2015 [PCT/ISA/210].
International Preliminary Report on Patentability dated Jan. 19, 2017, issued by the International Bureau for corresponding application No. PCT/JP2015/067753.

\* cited by examiner

CAPACITIVE TOUCH PANEL

CROSS-REFERENCE TO RELATED APPLICATIONS

This application is a Continuation of PCT International Application No. PCT/JP2015/067753 filed on Jun. 19, 2015, which claims priority under 35 U.S.C. § 119(a) to Japanese Patent Application No. 2014-145827 filed on Jul. 16, 2014. The above application is hereby expressly incorporated by reference, in its entirety, into the present application.

BACKGROUND OF THE INVENTION

1. Field of the Invention

The invention relates to a capacitive touch panel in which a temperature dependence of relative dielectric constants of an upper pressure sensitive adhesive layer and a lower pressure sensitive adhesive layer satisfies a predetermined relationship.

2. Description of the Related Art

In recent years, a rate of installation of touch panels to various devices such as a tablet PC, a car navigation system, an automatic ticket machine, or an ATM machine has increased, and particularly a capacitive touch panel that allows multipoint detection has been used (see JP2008-310551A).

SUMMARY OF THE INVENTION

A rate of installation of a capacitive touch panel to portable devices such as a cellular phone or a portable game machine has increased, and time periods over which these devices are used have increased. Therefore, when an operator (user) uses a portable device to which a capacitive touch panel is mounted, it is assumed that an operation is performed while a touch surface of a capacitive touch panel is touched by a finger for a longer period of time than those in the related art. Accordingly, a capacitive touch panel in which malfunction does not occur when an operation is performed after a finger of an operator touches a touch surface for a long period of time in a normal temperature environment is desirable. In this specification, the normal temperature refers to 20° C.

However, in a capacitive touch panel according to the related art, at the time of an operation after a finger of an operator touches the capacitive touch panel for a long period of time, malfunction easily occurs and thus further improvement is required.

In view of the above, an object of the invention is to provide a capacitive touch panel in which malfunction hardly occurs, even when an operation is performed after a finger of an operator touches the capacitive touch panel for a long period of time in a normal temperature environment.

The inventors have diligently conducted examinations with respect to the problems described above and, as a result, found that a main reason of malfunction is a change of a relative dielectric constant of a pressure sensitive adhesive layer. Based on this knowledge, the inventors conducted research and found that the above objects are achieved by the configurations below.

(1) A capacitive touch panel comprising: a display device; a lower pressure sensitive adhesive layer; a capacitive touch panel sensor, an upper pressure sensitive adhesive layer; and a protective substrate, in this order, in which temperature dependence of a relative dielectric constant of the upper pressure sensitive adhesive layer which is obtained by a temperature dependency evaluation test described below is 10.0% or less, temperature dependence of a relative dielectric constant of the lower pressure sensitive adhesive layer which is obtained by a temperature dependency evaluation test described below is equal to or greater than the temperature dependence of a relative dielectric constant of the upper pressure sensitive adhesive layer, and a difference between temperature dependence of a relative dielectric constant of the lower pressure sensitive adhesive layer and temperature dependence of a relative dielectric constant of the upper pressure sensitive adhesive layer is within 10.0%.

(2) The capacitive touch panel according to (1), in which the temperature dependence of the relative dielectric constant of the upper pressure sensitive adhesive layer is 5% or less.

(3) The capacitive touch panel according to (1) or (2), in which a difference between the temperature dependence of a relative dielectric constant of the lower pressure sensitive adhesive layer and the temperature dependence of a relative dielectric constant of the upper pressure sensitive adhesive layer is within 5%.

(4) The capacitive touch panel according to any one of (1) to (3), in which the capacitive touch panel sensor is a laminate comprising detection electrodes on both surfaces of the substrate and a laminate obtained by sticking substrates with detection electrodes comprising detection electrodes on one surface thereof via a pressure sensitive adhesive layer.

(5) The capacitive touch panel according to (4), in which the detection electrode is formed of any one selected from the group consisting of gold, silver, copper, aluminum, indium tin oxide, tin oxide, zinc oxide, cadmium oxide, gallium oxide, titanium oxide, a silver palladium alloy, and a silver palladium copper alloy.

(6) The capacitive touch panel according to any one of (1) to (5), in which a size of the display surface of the display device in a diagonal direction is 5 inches or greater.

According to the invention, it is possible to provide a capacitive touch panel in which malfunction hardly occurs, even when an operation is performed after a finger of an operator touches the capacitive touch panel for a long period of time in a normal temperature environment.

DESCRIPTION OF THE PREFERRED EMBODIMENTS

Figure 1:
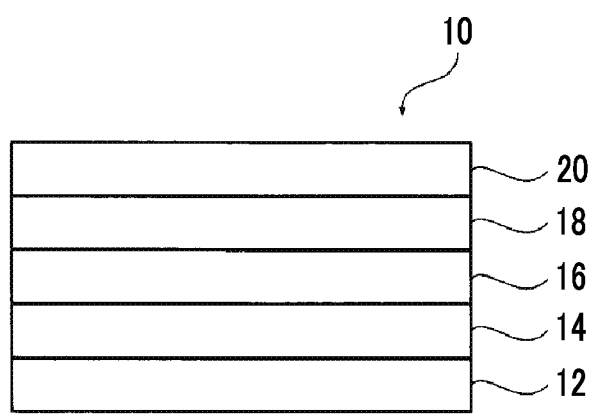
FIG. 1 is a cross-sectional view of an embodiment of a capacitive touch panel of the invention.

Hereinafter, preferable aspects of a capacitive touch panel (hereinafter, also referred to as "touch panel") of the invention will be described with reference to the drawings.

In this specification, a numerical value range represented by using the expression "to" means a scope of using numerical values before and after the expression "to" as a minimum value and a maximum value. Drawings according to the invention are schematic views and a relationship between thicknesses of respective layers and a positional relationship thereof are not identical to actual ones.

Examples of characteristics of the touch panel according to the invention include controlling temperature dependence of a relative dielectric constant of an upper pressure sensitive adhesive layer and temperature dependence of a relative dielectric constant of a lower pressure sensitive adhesive layer. A reason that a desired effect can be obtained with this configuration is described below. The temperature dependence is described below in detail, but the temperature dependence refers to a level of a change of relative dielectric constants of the respective layers by an environmental temperature.

First, as a representative configuration of a touch panel, a display device, a lower pressure sensitive adhesive layer, a capacitive touch panel sensor, an upper pressure sensitive adhesive layer, and a protective substrate are laminated in this order. As the protective substrate, for example, cover glass or the like is used, so as to form a touch surface. The operator performs an operation by touching a surface of a protective substrate with a finger.

Generally, a body temperature of an operator is higher than a temperature of a touch panel. Therefore, if an operator touches a touch panel, the body temperature of a finger spreads to an upper pressure sensitive adhesive layer via a protective substrate. If temperature dependence of a relative dielectric constant of the upper pressure sensitive adhesive layer is great, parasitic capacitance due to the upper pressure sensitive adhesive layer greatly changes by a temperature. Particularly, if the same portion is touched with a finger for a long period of time, a temperature of the upper pressure sensitive adhesive layer at a touched portion changes, and a capacitance change remains even if the finger is separated. As a result, a capacitance between detection electrodes changes, deviation from a value that is initially set occurs, and thus malfunction occurs. Therefore, it is required to set temperature dependence of a relative dielectric constant of the upper pressure sensitive adhesive layer to be a predetermined value or lower.

The present inventors conducted research in the same manner with respect to the lower pressure sensitive adhesive layer and found it is desirable that the temperature dependence of the relative dielectric constant of the lower pressure sensitive adhesive layer is equal to or greater than temperature dependence of the relative dielectric constant of the upper pressure sensitive adhesive layer and a difference therebetween is within a predetermined range. The reason thereof is not clear, but it is assumed as follows. Since the lower pressure sensitive adhesive layer is far from the touch surface, the lower pressure sensitive adhesive layer is hardly influenced by the temperature from a finger of a human. Due to the heat generation from the display device side, a temperature near the display device is more stable than that near the upper pressure sensitive adhesive layer, and thus it is desirable that temperature dependence of the relative dielectric constant is not too great in the same manner as the upper pressure sensitive adhesive layer, but the temperature dependence of the relative dielectric constant is not required to be as low as that of the upper pressure sensitive adhesive layer. It is assumed that, if the temperature dependence of the lower pressure sensitive adhesive layer is in a level greater than that of the upper pressure sensitive adhesive layer by 0% to 10%, the temperature dependence of the lower pressure sensitive adhesive layer sufficiently contributes to suppression of malfunction.

FIG. 1 is a cross-sectional view of an embodiment of a capacitive touch panel of the invention.

As illustrated in FIG. 1, a capacitive touch panel 10 comprises a display device 12, a lower pressure sensitive adhesive layer 14, a capacitive touch panel sensor 16, an upper pressure sensitive adhesive layer 18, and a protective substrate 20 in this order. In the capacitive touch panel 10, if a finger comes close to and into contact with a surface (touch surface) of the protective substrate 20, an electrostatic capacitance between the finger and a detection electrode in the capacitive touch panel sensor 16 changes. Here, a position detection driver (not illustrated) always detects the change of the electrostatic capacitance between the finger and the detection electrode. If the position detection driver detects the change of the electrostatic capacitance in the predetermined value or greater, a position at which the change of the electrostatic capacitance is detected is detected, as an input position. In this manner, the capacitive touch panel 10 can detect an input position.

Hereinafter, respective members of the capacitive touch panel 10 are described in detail. First, aspects of the upper pressure sensitive adhesive layer 18 and the lower pressure sensitive adhesive layer 14 which are characteristics of the invention are described in detail, and then other members are described in detail.

(Upper Pressure Sensitive Adhesive Layer)

The upper pressure sensitive adhesive layer 18 is a layer for securing adhesiveness between the capacitive touch panel sensor 16 described below and the protective substrate 20 described below.

With respect to the upper pressure sensitive adhesive layer 18, the temperature dependence of the relative dielectric constant obtained from a temperature dependency evaluation test described below is 10.0% or less. Among these, in view of suppressing the generation of the malfunction of the touch panel (hereinafter, simply referred to as "in view of excellently exhibiting the effect of the invention"), the temperature dependence of the relative dielectric constant is preferably 8.0% or less, more preferably 5.0% or less, even more preferably 3.0% or less, and particularly preferably 2.0% or less. The lower limit is not particularly limited. As the lower limit is lower, the lower limit is more preferable, and 0% is most preferable.

In a case where temperature dependence of the relative dielectric constant is greater than 10.0%, malfunction of the touch panel easily occurs.

A method for performing a temperature dependency evaluation test is described below. The measurement of the relative dielectric constant in which an impedance measurement technique at respective temperatures described below is generally referred to as a capacitance method. The capacitance method is conceptually a method for forming a capacitor by interposing a specimen between electrodes and calculating a relative dielectric constant from the measured capacity value. Hereinafter, with respect to the measurement of the temperature dependence described below, the reason that 20° C. and 40° C. are used as a test environment is because use at a normal temperature (20° C.) is assumed as an actual use environment and because a temperature of the touch panel is assumed to be 40° C. or lower, even if heat spreads from a finger of an operator to the touch panel, since a body temperature of an operator is generally 40° C. or lower.

Figure 2:
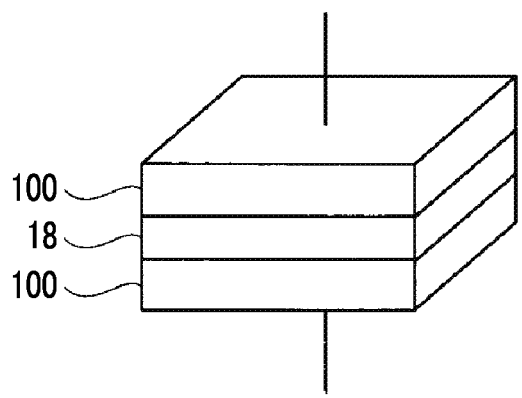
FIG. 2 is a schematic diagram of a sample for evaluation which is used in a temperature dependency evaluation test.

First, as illustrated in FIG. 2, the upper pressure sensitive adhesive layer 18 (thickness: 100 to 500 µm) which is a measurement target is sandwiched between a pair of aluminum electrodes 100 (electrode size: 20 mm×20 mm), a pressurizing and defoaming treatment is performed at 40° C. at 5 atmospheres for 60 minutes, so as to produce a sample for evaluation.

Thereafter, the temperature of the upper pressure sensitive adhesive layer 18 in a sample is adjusted to 20° C. and 40° C., and a capacitance C is obtained by impedance measurement at 1 MHz using an impedance analyzer (4294A manufactured by Agilent Technologies) at respective temperatures. Thereafter, the obtained capacitance C and a thickness T of the upper pressure sensitive adhesive layer are multiplied, the obtained value is divided by a product of a size S of aluminum electrode and a dielectric constant so (8.854× $10^{-12}$ F/m) of vacuum, so as to calculate a relative dielectric constant. That is, a relative dielectric constant is calculated by Expression (X): relative dielectric constant=(Capacitance C×Thickness T)/(Size S×Dielectric constant Co of vacuum).

Specifically, the temperature of the upper pressure sensitive adhesive layer is increased in stages so as to be 20° C. and 40° C., and the upper pressure sensitive adhesive layer is left alone for 5 minutes at each temperature until the temperature of the pressure sensitive adhesive layer is stabilized. Then, relative dielectric constants at respective temperature are calculated from values obtained by calculating the capacitance C by impedance measurement at 1 MHz at the temperatures.

The thickness of the upper pressure sensitive adhesive layer is a value obtained by measuring thicknesses of the upper pressure sensitive adhesive layer at arbitrary points in at least five or more portions and arithmetically averaging these thicknesses.

Thereafter, the calculated relative dielectric constant of the upper pressure sensitive adhesive layer at 20° C. and the calculated relative dielectric constant of the upper pressure sensitive adhesive layer at 40° C. are compared with each other, a greater one is used as a maximum value ($\varepsilon_{max}$) a smaller one is used as a minimum value ($\varepsilon_{min}$), and a ratio of a difference between the both to the minimum value is obtained. Specifically, a value (%) calculated by Equation [{(maximum value ($\varepsilon_{max}$)−minimum value ($\varepsilon_{min}$))/minimum value ($\varepsilon_{min}$)}×100] is obtained, and the value is set to be temperature dependence.

However, in a case where the relative dielectric constant of the pressure sensitive adhesive layer at 20° C. and the relative dielectric constant of the pressure sensitive adhesive layer at 40° C. are the same, the temperature dependence is set to be 0%.

Figure 3:
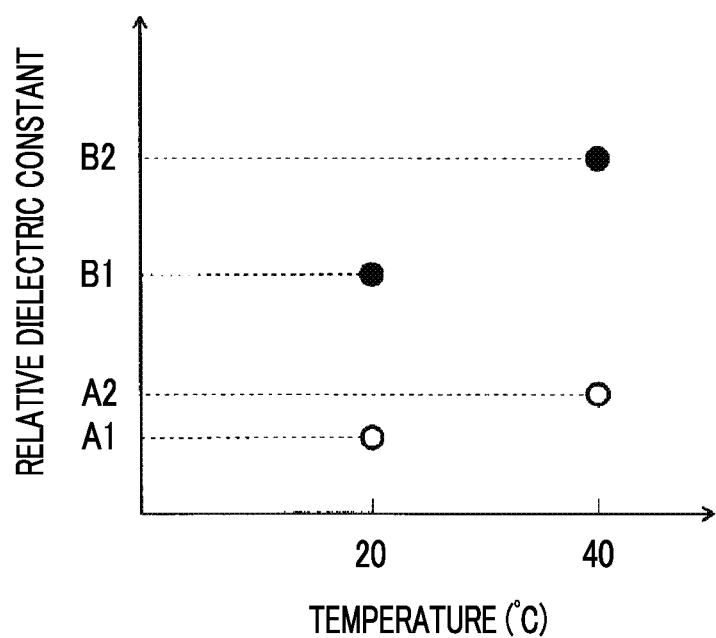
FIG. 3 is an example of results of temperature dependency evaluation tests.

An example of results of temperature dependency evaluation tests is illustrated in FIG. 3. A lateral axis of FIG. 3 represents a temperature, and a vertical axis thereof represents a relative dielectric constant. FIG. 3 is an example of measurement results of two types of pressure sensitive adhesive layers, one is indicated by white circles, and the other is indicated by black circles.

With reference to FIG. 3, in a pressure sensitive adhesive layer A indicated by white circles, relative dielectric constants at respective temperatures are comparatively in the vicinity, and changes thereof are also small. That is, it is indicated that changes of the relative dielectric constant of the pressure sensitive adhesive layer A due to temperatures are small, and thus the relative dielectric constant of the pressure sensitive adhesive layer A hardly changes. As a result, the capacitance between detection electrodes easily deviates from the initially set value, and thus malfunction hardly occurs. The temperature dependence (%) of the pressure sensitive adhesive layer A can be obtained by Equation [(A2−A1)/A1×100] by selecting A1 which is the minimum value and A2 which is the maximum value of the white circles in FIG. 3.

Meanwhile, with respect to the pressure sensitive adhesive layer B indicated with black circles, as the temperature increases, the relative dielectric constant greatly increases, and the changes thereof are great. That is, it is indicated that changes of the relative dielectric constant of the pressure sensitive adhesive layer B due to temperatures are great, the capacitance between detection electrodes hardly deviates from the initially set value, and thus malfunction easily occurs. The temperature dependence (%) of the pressure sensitive adhesive layer B can be obtained by Equation [(B2−B1)/B1×100] by selecting B1 which is the minimum value and B2 which is the maximum value of the black circles in FIG. 3.

That is, the temperature dependence refers to a level of changes of the dielectric constant due to temperatures. Therefore, if this value is small, a relative dielectric constant in an actual use environmental (in room temperature environmental) hardly changes. Meanwhile, if this value is great, a relative dielectric constant easily changes.

FIG. 3 corresponds to a form in which the maximum value A2 of the relative dielectric constants of the pressure sensitive adhesive layer A at respective temperatures is smaller than the minimum value B1 of the relative dielectric constants of the pressure sensitive adhesive layer B at respective temperatures.

The magnitude of the relative dielectric constant of the upper pressure sensitive adhesive layer 18 at 20° C. is not particularly limited. In view of excellently exhibiting the effect of the invention, the relative dielectric constant of the upper pressure sensitive adhesive layer 18 at 20° C. is preferably 3.50 or less, more preferably 3.20 or less, and even more preferably 3.00 or less. The lower limit is not particularly limited. However, in view of adhesiveness, the lower limit is preferably 2.20 or greater.

The magnitude of the relative dielectric constant of the upper pressure sensitive adhesive layer 18 at 40° C. is not particularly limited. However, in view of excellently exhibiting the effect of the invention, the relative dielectric constant of the upper pressure sensitive adhesive layer 18 at 40° C. is preferably 4.00 or less, more preferably 3.50 or less, and even more preferably 3.00 or less. The lower limit is not particularly limited. However, in view of adhesiveness, the lower limit is preferably 2.20 or greater.

The method for measuring the relative dielectric constant is the same as the order of the temperature dependency evaluation test.

The thickness of the upper pressure sensitive adhesive layer 18 is not particularly limited, but the thickness is preferably 5 to 350 µm, more preferably 30 to 250 µm, and even more preferably 30 to 150 µm. If the thickness is in the range described above, desired transmittance of the visible light can be obtained, and also handling is facilitated.

The upper pressure sensitive adhesive layer 18 is preferably optically transparent. That is, a transparent pressure sensitive adhesive layer is preferable. The expression "optically transparent" means that the total light transmittance is 85% or higher. The total light transmittance is preferably 90% or higher, and more preferably 100%.

Types of the material forming the upper pressure sensitive adhesive layer 18 are not particularly limited, as long as the temperature dependence is satisfied. Examples thereof include an acrylic pressure sensitive adhesive, a rubber-based pressure sensitive adhesive, and a silicone-based pressure sensitive adhesive. Here, the acrylic pressure sensitive adhesive is a pressure sensitive adhesive including a polymer ((meth)acrylic polymer) formed of monomer components including an acrylate monomer and/or a methacrylate monomer. In the acrylic pressure sensitive adhesive, the polymer is included as a base polymer, but other components (a viscosity imparting agent, a rubber component, and the like described below) may be included.

The (meth)acrylic polymer has a meaning including both of an acrylic polymer and a methacrylic polymer. In this specification, in the monomer components used at the time of manufacturing the (meth)acrylic polymer included in the acrylic pressure sensitive adhesive, and other monomers (for example, an acrylamide monomer and a vinyl monomer) in addition to an acrylate monomer and a methacrylate monomer may be included.

Examples of the monomer ((meth)acrylate monomer) used at the time of manufacturing the (meth)acrylic polymer include methyl (meth)acrylate, ethyl (meth)acrylate, butyl (meth)acrylate, isobutyl (meth)acrylate, t-butyl (meth)acrylate, cyclohexyl (meth)acrylate, tetrahydrofurfuryl (meth)acrylate, 2-ethylhexyl (meth)acrylate, dodecyl (meth)acrylate, isononyl (meth)acrylate, isodecyl (meth)acrylate, stearyl (meth)acrylate, 2-hydroxyethyl (meth)acrylate, 2-hydroxypropyl (meth)acrylate, 2-hydroxybutyl (meth)acrylate, isobornyl (meth)acrylate, butoxydiethylene glycol (meth)acrylate, benzyl (meth)acrylate, dicyclohexyl (meth)acrylate, 2-dicyclohexyloxyethyl (meth)acrylate, phenoxyethyl (meth)acrylate, dimethylaminoethyl (meth)acrylate, ethylene glycol di(meth)acrylate, 1,4-butanediol dimethacrylate, neopentyl glycol di(meth)acrylate, 1,6-hexanediol di(meth)acrylate, trimethylolpropane tri(meth)acrylate, nonanediol di(meth)acrylate, tris(2-acryloyloxyethyl) isocyanurate, 2-morpholinoethyl (meth)acrylate, 9-anthryl methacrylate, 2,2-bis(4-methacryloxy phenyl) propane, pentaerythritol tetra(meth)acrylate, dipentaerythritol hexa(meth)acrylate, and trans-1,4-cyclohexanediol dimethacrylate.

"(Meth)acrylate" is a general term meaning both of acrylate and methacrylate.

Examples of one of a suitable form of the upper pressure sensitive adhesive layer 18 include a form of including an acrylic pressure sensitive adhesive. Particularly, it is preferable that a (meth)acrylic polymer having a repeating unit derived from a (meth)acrylate monomer having a hydrocarbon group having a carbon number (the number of carbon atoms) of at least 4 or greater is included in the upper pressure sensitive adhesive layer 18. The (meth)acrylate monomer has a meaning of including both of an acrylate monomer and a methacrylate monomer.

Examples of the (meth)acrylate monomer having the carbon number include 2-ethylhexyl (meth)acrylate, n-octyl (meth)acrylate, isooctyl (meth)acrylate, n-nonyl (meth)acrylate, isononyl (meth)acrylate, n-decyl (meth)acrylate, isodecyl (meth)acrylate, n-dodecyl (meth)acrylate, n-tridecyl (meth)acrylate, n-tetradecyl (meth)acrylate, n-hexadecyl (meth)acrylate, stearyl (meth)acrylate, isobornyl (meth)acrylate, dicyclopentenyl (meth)acrylate, and dicyclopentanyl (meth)acrylate.

Examples of the (meth)acrylate monomer having the hydrocarbon group having the carbon number include a (meth)acrylate monomer having a chain aliphatic hydrocarbon group having the carbon number and a (meth)acrylate monomer having a cyclic aliphatic hydrocarbon group having the carbon number.

In view of excellently exhibiting the effect of the invention, a carbon number in the hydrocarbon group is preferably 6 or greater, more preferably 6 to 20, and even more preferably 8 to 16.

The chain aliphatic hydrocarbon group may have any one of a linear shape or a branched chain shape.

Examples of preferable forms of the (meth)acrylic polymer include (meth)acrylic polymers having a repeating unit derived from a (meth)acrylate monomer having a chain aliphatic hydrocarbon group having the carbon number and a repeating unit derived from a (meth)acrylate monomer having a cyclic aliphatic hydrocarbon group having the carbon number.

A repeating unit derived from a monomer (for example, carboxylic acid group-containing (meth)acrylate (for example, an acrylic acid), hydroxyl group-containing (meth)acrylate (for example, 2-hydroxyethyl acrylate)) in addition to monomers described above may be included in the (meth)acrylic polymer, without deteriorating the effect of the invention.

The (meth)acrylic polymer may have a crosslinking structure. A method for forming a crosslinking structure is not particularly limited, and examples thereof include a method for using a bifunctional (meth)acrylate monomer or a method for introducing a reactive group (for example, a hydroxyl group) to a (meth)acrylic polymer and causing the reactive group to react with a crosslinking agent that reacts with the reactive group. Specific examples of the latter method include a method for manufacturing a pressure sensitive adhesive layer causing a (meth)acrylic polymer having a repeating unit derived from a (meth)acrylate monomer having a group having one or more types of active hydrogen selected from the group consisting of a hydroxyl group, a primary amino group, and a secondary amino group to react with an isocyanate-based crosslinking agent (a compound having two or more isocyanate groups).

The content of the (meth)acrylic polymer in the upper pressure sensitive adhesive layer 18 is not particularly limited. However, in view of excellently exhibiting the effect of the invention, the content thereof is preferably 10 to 95 mass %, more preferably 10 to 50 mass %, and even more preferably 15 to 40 mass % with respect to the total mass of the upper pressure sensitive adhesive layer.

In the upper pressure sensitive adhesive layer 18, a viscosity imparting agent may be further included.

As the viscosity imparting agent, well-known agents in the field of patches or patch preparations can be appropriately selected to be used. Examples thereof include a petroleum resin (for example, an aromatic petroleum resin, an aliphatic petroleum resin, an aliphatic/aromatic mixture petroleum resin, and a resin produced by C9 fraction), a terpene-based resin (for example, an α-pinene resin, a β-pinene resin, and a resin obtained by copolymerizing a mixture of any of an α-pinene/β-pinene/dipentene, a terpene phenol copolymer, a hydrogenated terpene phenol resin, aromatic modified hydrogenated terpene, and an abietic acid ester-based resin), a rosin-based resin (for example, a partially hydrogenated gum rosin resin, an erythritol modified wood rosin resin, a tall oil rosin resin, a wood rosin resin, gum rosin, a rosin-modified maleic acid resin, polymerized rosin, rosin phenol, and a rosin ester), and a coumarone-indene resin (for example, a coumarone indene styrene copolymer).

The viscosity imparting agents can be used alone or in combination of two or more types thereof, and in a case where two or more types are used in combination, for example, different types of resins may be combined, or resins of the same type having different softening points may be combined.

The content of the viscosity imparting agent in the upper pressure sensitive adhesive layer 18 is not particularly limited, but in view of excellently exhibiting the effect of the invention, the content thereof is preferably 10 to 60 mass % and more preferably 20 to 50 mass % with respect to the total mass of the upper pressure sensitive adhesive layer.

A rubber component (softening agent) may be included in the upper pressure sensitive adhesive layer 18.

Examples of the rubber component include polyolefin or modified polyolefin. Examples of the rubber component include natural rubber, polyisobutylene, polybutadiene, polyisoprene, polybutene, hydrogenated polyisoprene, hydrogenated polybutadiene, a styrene-butadiene copolymer, or a copolymer or a polymer mixture in a combination arbitrarily selected from these groups.

The content of the rubber component in the upper pressure sensitive adhesive layer 18 is not particularly limited. However, in view of excellently exhibiting the effect of the invention, the content thereof is preferably 1 to 50 mass % and more preferably 5 to 50 mass % with respect to a total mass of the upper pressure sensitive adhesive layer.

One of suitable forms of the upper pressure sensitive adhesive layer 18 is a pressure sensitive adhesive layer obtained by performing a hardening treatment on a pressure sensitive adhesive composition including a (meth)acrylate monomer having a hydrocarbon group having a carbon number of at least 4 or greater. The definition of the (meth)acrylate monomer is as described above.

It is preferable that the viscosity imparting agent is included in the pressure sensitive adhesive composition.

It is preferable that the rubber component is included in the pressure sensitive adhesive composition. As the rubber component, a rubber component having a polymerizable group may be included. Specifically, examples thereof include one that has a (meth)acryloyl group and that is selected from the group consisting of polybutadiene, polyisoprene, polyisobutylene, hydrogenated polybutadiene, and hydrogenated polyisoprene. That is, a rubber component having a polymerizable group and a rubber component not having a polymerizable group may be included in the pressure sensitive adhesive composition.

Examples of the polymerizable group include a well-known radical polymerizable group (a vinyl group, a (meth)acryloyl group, and the like) or a well-known cation polymerizable group (an epoxy group and the like).

The content of the viscosity imparting agent in the pressure sensitive adhesive composition is not particularly limited, but is preferably 80 to 320 parts by mass and more preferably 120 to 270 parts by mass with respect to 100 parts by mass of the (meth)acrylate monomer.

The content of the rubber component in the pressure sensitive adhesive composition is not particularly limited, but is preferably 5 to 320 parts by mass and more preferably 5 to 280 parts by mass with respect to 100 parts by mass of the (meth)acrylate monomer.

Other additives (for example, a polymerization initiator, a thermocuring agent, an antioxidant, transparent particles, a plasticizer, and a chain transfer agent) in addition to the components may be included in the pressure sensitive adhesive composition.

For example, as the polymerization initiator, a photopolymerization initiator such as (1-hydroxy)cyclohexyl phenyl ketone and acylphosphine oxide and a thermal polymerization initiator such as azobisalkylol nitrile or perbutyl can be used.

For example, as the thermocuring agent, polyvalent isocyanate, or epoxy-based or oxetane-based thermocuring agents are selected.

For example, as the antioxidant, known hindered phenol (pentaerythritol tetrakis[3-(3,3-di-tert-butyl-4-hydroxyphenyl)propionate], 2,4-bis(octylthiomethyl)orthocresol), and a hindered amine can be used.

As the transparent particles, particles in an optically minute size that cannot be visually recognized (nanosilica and the like) can be appropriately used without departing from the gist of the invention.

For example, as the chain transfer agent, 1-dodecanethiol, trimethylolpropane tristhiopropionate, and pentaerythritol tetrakis thiopropionate are used.

An order of manufacturing the upper pressure sensitive adhesive layer 18 from the pressure sensitive adhesive composition is not particularly limited, and well-known methods can be employed. Examples thereof include a method for coating a predetermined substrate (for example, a peelable substrate) with a pressure sensitive adhesive composition, performing a drying treatment, if necessary, and performing the hardening treatment described above.

Examples of the coating method include well-known methods. For example, known coating devices such as an applicator, gravure coater, curtain coater, a comma coater, a slot die coater, and a lip coater are used.

Examples of the hardening treatment performed to the pressure sensitive adhesive composition include a photocuring treatment and a thermocuring treatment. In other words, the pressure sensitive adhesive layer is preferably formed by hardening a photocuring pressure sensitive adhesive or a thermocuring pressure sensitive adhesive. As the pressure sensitive adhesive composition (curable composition) used in hardening, according to characteristics of the hardening reaction, not only the monomer mixture but also a pressure sensitive adhesive composition obtained by blending a polymer obtained by polymerizing monomers in advance with a monomer or a polymer having hardening reactivity may be used.

The light hardening treatment may consist of a plurality of hardening processes, and a light wavelength to be used may be appropriately selected from a plurality of wavelengths. A thermal hardening treatment may also consist of a plurality of hardening processes, and a method for providing heat may be selected from an appropriate method such as an oven, a reflow furnace, and an IR heater. Otherwise, a light hardening treatment and a thermal hardening treatment may be appropriately combined.

Particularly, if a pressure sensitive adhesive layer is formed by a photocuring treatment, it is comparatively easy to reduce deformation of the pressure sensitive adhesive layer with time and it is preferable in view of manufacturing suitability.

(Lower Pressure Sensitive Adhesive Layer 14)

The lower pressure sensitive adhesive layer 14 is a layer for securing adhesiveness between the display device 12 described below and the capacitive touch panel sensor 16 described below.

The temperature dependence of the relative dielectric constant of the lower pressure sensitive adhesive layer 14 obtained from the temperature dependency evaluation test is equal to or greater than the temperature dependence of the relative dielectric constant of the upper pressure sensitive adhesive layer 18 described above, and a difference (the temperature dependence of the relative dielectric constant of the lower pressure sensitive adhesive layer 14—temperature dependence of the relative dielectric constant of the upper pressure sensitive adhesive layer 18) between the temperature dependence of the relative dielectric constant of the lower pressure sensitive adhesive layer 14 and the temperature dependence of the relative dielectric constant of the upper pressure sensitive adhesive layer 18 is 0% to 10.0%.

In other words, the temperature dependence of the relative dielectric constant of the lower pressure sensitive adhesive layer 14 and the temperature dependence of the relative dielectric constant of the upper pressure sensitive adhesive layer 18 satisfies the relationship described below.

0≤temperature dependence of relative dielectric constant of the lower pressure sensitive adhesive layer 14—temperature dependence of relative dielectric constant of the upper pressure sensitive adhesive layer 18≤10%    Expression (X):

Among these, in view of excellently exhibiting the effect of the invention, a difference between the temperature dependence of the relative dielectric constant of the lower pressure sensitive adhesive layer 14 and the temperature dependence of the relative dielectric constant of the upper pressure sensitive adhesive layer 18 is preferably within 5.0% (0% to 5.0%) and more preferably within 3.0% (0% to 3.0%).

A method for measuring temperature dependence of a relative dielectric constant of the lower pressure sensitive adhesive layer 14 is the same as the method for measuring temperature dependence of a relative dielectric constant of the upper pressure sensitive adhesive layer 18 described above.

The magnitude of the relative dielectric constant of the lower pressure sensitive adhesive layer 14 at 20° C. is not particularly limited. However, in view of excellently exhibiting the effect of the invention, the relative dielectric constant is preferably 4.50 or less, more preferably 4.00 or less, and even more preferably 3.50 or less. The lower limit thereof is not particularly limited. However, in view of adhesiveness, the lower limit of the relative dielectric constant is preferably 2.20 or greater.

The magnitude of the relative dielectric constant of the lower pressure sensitive adhesive layer 14 at 40° C. is not particularly limited. However, in view of excellently exhibiting the effect of the invention, the relative dielectric constant is preferably 4.50 or less, more preferably 4.00 or less, and even more preferably 3.50 or less. The lower limit is not particularly limited. However, in view of adhesiveness, the lower limit of the relative dielectric constant is preferably 2.20 or greater.

The method for measuring the relative dielectric constant is the same as an order of the temperature dependency evaluation test.

The thickness of the lower pressure sensitive adhesive layer 14 is not particularly limited, but the thickness is preferably 5 to 350 μm, more preferably 30 to 300 μm, and even more preferably 30 to 250 μm. If the thickness is in the range described above, desired transmittance of the visible light can be obtained and dealing is facilitated.

The relationship between the thickness of the lower pressure sensitive adhesive layer 14 and the thickness of the upper pressure sensitive adhesive layer 18 is not particularly limited. However, in view of balance between the strength and the thickness reduction of the touch panel, a form in which the thickness of the lower pressure sensitive adhesive layer 14 is equal to or greater than the thickness of the upper pressure sensitive adhesive layer 18 is preferable.

The lower pressure sensitive adhesive layer 14 is preferably optically transparent. That is, the lower pressure sensitive adhesive layer 14 is preferably a transparent pressure sensitive adhesive layer. The expression "optically transparent" means that a total light transmittance is 85% or greater, preferably 90% or greater, and more preferably 100%.

As a material for forming the lower pressure sensitive adhesive layer 14, types thereof are not particularly limited. Examples thereof include materials forming the upper pressure sensitive adhesive layer 18 described above.

(Display Device)

The display device 12 is a device having a display surface that displays an image, and respective members (for example, the lower pressure sensitive adhesive layer 14) are disposed on the display surface side.

Types of the display device 12 are not particularly limited, but a known display device can be used. Examples thereof include a cathode ray tube (CRT) display device, a liquid crystal display device (LCD), an organic light emitting diode (OLED) display device, a vacuum fluorescent display (VFD), a plasma display panel (PDP), a surface-conduction electron-emitter display (SED), a field emission display (FED), or an electronic paper (E-Paper).

(Protective Substrate)

The protective substrate 20 is a substrate disposed on the upper pressure sensitive adhesive layer 18 and fulfills roles of protecting the capacitive touch panel sensor 16 or the display device 12 described below, from the external environment and also the main surface thereof form a touch surface.

The protective substrate 20 is preferably a transparent substrate, and a plastic plate (a plastic film), a glass plate, and the like can be used. It is desirable that the thickness of the substrate is appropriately selected depending on the respective uses.

As the material for forming the plastic plate, for example, polyesters such as polyethylene terephthalate (PET) and polyethylene naphthalate (PEN); polyolefins such as polyethylene (PE), polypropylene (PP), polystyrene, and EVA; vinyl-based resins; and other materials such as polycarbonate (PC), polyamide, polyimide, acrylic resins, triacetyl cellulose (TAC), and cycloolefine-based resins (COP) can be used.

A polarizing plate, a circularly polarizing plate, or the like may be used as the protective substrate 20.

(Capacitive Touch Panel Sensor)

The capacitive touch panel sensor 16 is a sensor which is disposed on the display device 12 (operator side) and detects a position of an external conductor such as a human finger using a change in the capacitance generated in a case where the external conductor such as a human finger is brought into contact with (brought close to) the sensor.

The configuration of the capacitive touch panel sensor 16 is not particularly limited, but in general, the capacitive touch panel sensor has detection electrodes (particularly, detection electrodes extending in X-direction and detection electrodes extending in Y-direction), and detects a change in the capacitance of the detection electrode brought into contact with or brought close to a finger to specify coordinates of the finger.

Using FIG. 4, a preferable aspect of the capacitive touch panel sensor 16 will be described in detail.

Figure 4:
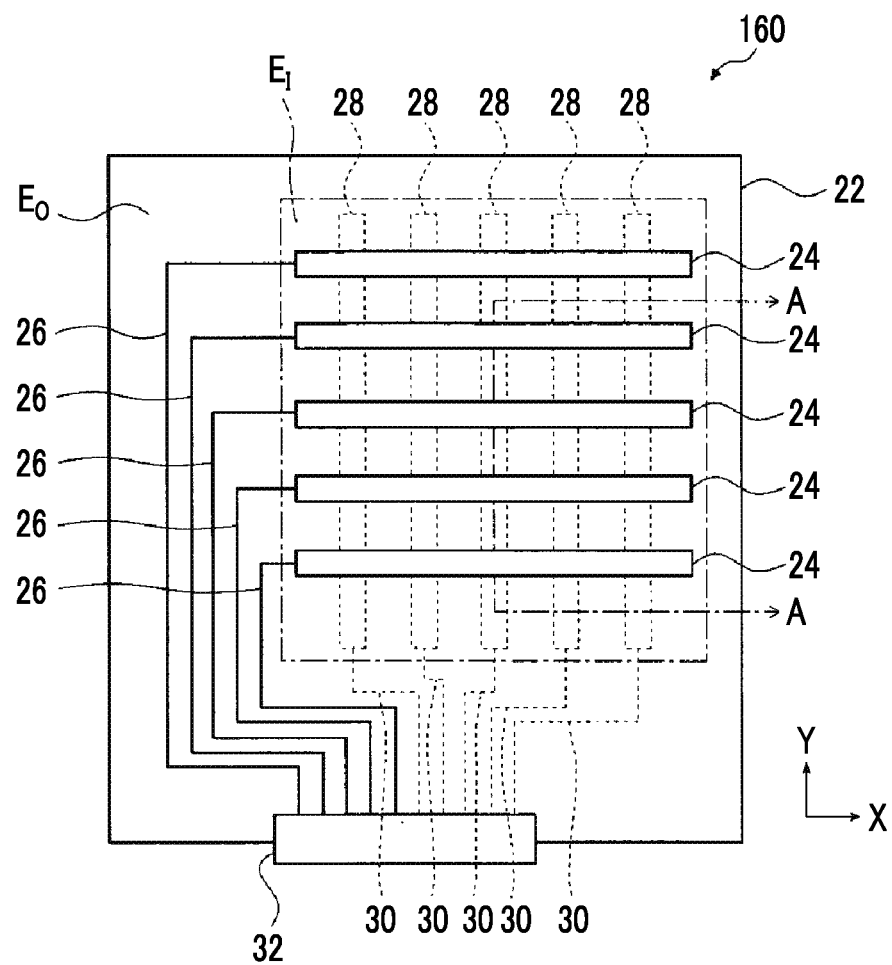
FIG. 4 is a plan view of an embodiment of the capacitive touch panel sensor.
Figure 5:
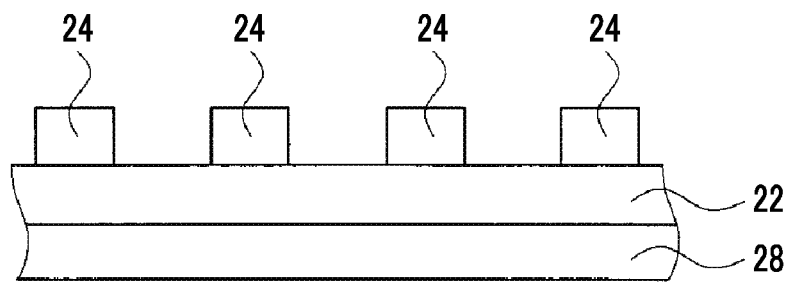
FIG. 5 is a cross-sectional view taken along cutting line A-A shown in FIG. 4.

FIG. 4 shows a plan view of a capacitive touch panel sensor 160. FIG. 5 is a cross-sectional view taken along cutting line A-A of FIG. 4. The capacitive touch panel sensor 160 comprises a substrate 22, first detection electrodes 24 which are disposed on one main surface (on front surface) of the substrate 22, first lead-out wirings 26, second detection electrodes 28 which are disposed on the other main surface (on rear surface) of the substrate 22, second lead-out wirings 30, and a flexible printed wiring board 32. The region where the first detection electrodes 24 and the second detection electrodes 28 are formed constitutes an input region $E_I$ (input region (sensing portion) in which contact of object can be detected) where an operator can perform an input operation, and in an the outside region $E_O$ positioned on the outside of the input region $E_I$, the first lead-out wirings 26, the second lead-out wirings 30, and the flexible printed wiring board 32 are disposed.

Hereinafter, the above configuration will be described in detail.

The substrate 22 is a member which acts to support the first detection electrodes 24 and the second detection electrodes 28 in the input region $E_I$ and acts to support the first lead-out wiring 26 and the second lead-out wiring 30 in the outside region $E_O$.

The substrate 22 preferably appropriately transmits light. Specifically, the total light transmittance of the substrate 22 is preferably 85% to 100%.

The substrate 22 preferably has insulating properties (is insulating substrate). That is, the substrate 22 is a layer for securing insulating properties between the first detection electrodes 24 and the second detection electrodes 28.

The substrate 22 is preferably a transparent substrate (particularly, transparent insulating substrate). Specific examples thereof include an insulating resin substrate, a ceramic substrate, and a glass substrate. Among these, an insulating resin substrate is preferable due to excellent toughness.

Specific examples of the material of the insulating resin substrate include polyethylene terephthalate, polyether sulfone, a polyacrylic resin, a polyurethane-based resin, polyester, polycarbonate, polysulfone, polyamide, polyarylate, polyolefin, a cellulose-based resin, polyvinyl chloride, and a cycloolefine-based resin. Among these, polyethylene terephthalate, a cycloolefine-based resin, polycarbonate, and a triacetyl cellulose resin are preferable due to excellent transparency.

In FIG. 4, the substrate 22 is a single layer, but may be a multi-layer of two or more layers.

The thickness of the substrate 22 (when the substrate 22 is a multi-layer of two or more layers, total thickness of the layers) is not particularly limited, but is preferably 5 to 350 μm, and even more preferably 30 to 150 μm. When the thickness is within the range, a desired visible light transmittance is obtained, and handling is facilitated.

In FIG. 4, the substrate 22 substantially has a rectangular shape when viewed from the top, but the shape is not limited thereto. For examples, the shape may be a circular shape or a polygonal shape.

The first detection electrodes 24 and the second detection electrodes 28 are sensing electrodes which sense a change in the capacitance, and constitute a sensing portion (sensor portion). That is, when a fingertip is brought into contact with the touch panel, the mutual capacitance between the first detection electrode 24 and the second detection electrode 28 changes, and based on this change, the position of the fingertip is calculated by an IC circuit.

The first detection electrodes 24 act to detect an input position of an operator's finger brought close to the input region $E_I$ in the X-direction, and have a function to generate a capacitance between the finger and the first detection electrode. The first detection electrodes 24 are electrodes which extend in a first direction (X-direction) and are arranged with predetermined intervals therebetween in a second direction (Y-direction) perpendicular to the first direction, and have a predetermined pattern as will be described later.

The second detection electrodes 28 act to detect an input position of an operator's finger brought close to the input region $E_I$ in the Y-direction, and have a function to generate a capacitance between the finger and the second detection electrode 28. The second detection electrodes 28 are electrodes which extend in the second direction (Y-direction) and are arranged with predetermined intervals therebetween in the first direction (X-direction), and have a predetermined pattern as will be described later. In FIG. 4, five first detection electrodes 24 and five second detection electrodes 28 are provided. However, the number is not particularly limited, but may be more than one.

Figure 6:
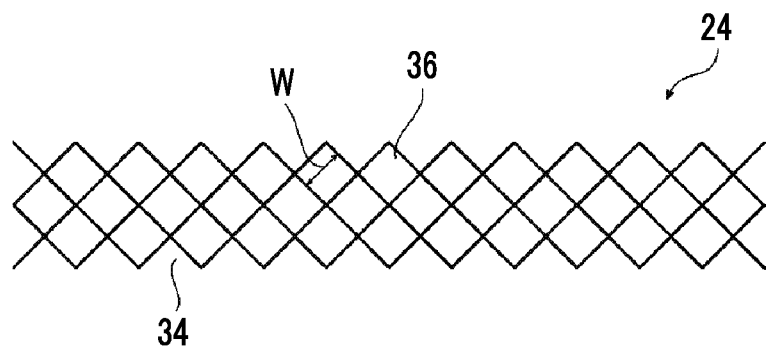
FIG. 6 is an enlarged plan view of a first detection electrode.

In FIG. 4, the first detection electrodes 24 and the second detection electrodes 28 are composed of fine conductive wires. FIG. 6 shows an enlarged plan view of a part of the first detection electrode 24. As shown in FIG. 6, the first detection electrodes 24 are composed of fine conductive wires 34 and include a plurality of lattices 36 formed by intersecting fine conductive wires 34. Similarly to the first detection electrodes 24, the second detection electrodes 28 also include a plurality of lattices 36 formed by intersecting fine conductive wires 34.

Examples of the material of the fine conductive wire 34 include metals such as gold (Au), silver (Ag), copper (Cu), aluminum (Al), and palladium (Pd) and alloys thereof (for example, a silver-palladium alloy, a silver-palladium-copper alloy), and metal oxides such as indium tin oxide (ITO), tin oxide, zinc oxide, cadmium oxide, gallium oxide, and titanium oxide. Among these, silver is preferable since the fine conductive wire 34 has excellent conductive properties.

The fine conductive wire 34 preferably contains a binder from the viewpoint of adhesiveness between the fine conductive wire 34 and the substrate 22.

As the binder, a water-soluble polymer is preferable since more excellent adhesiveness is obtained between the fine conductive wire 34 and the substrate 22. Examples of the type of the binder include polysaccharides such as gelatin, carrageenan, polyvinyl alcohol (PVA), polyvinylpyrrolidone (PVP), and starch, cellulose and derivatives thereof, polyethylene oxide, polysaccharide, polyvinylamine, chitosan, polylysine, polyacrylic acid, polyalginic acid, polyhyaluronic acid, carboxy cellulose, gum arabic, and sodium alginate. Among these, gelatin is preferable since more excellent adhesiveness is obtained between the fine conductive wire 34 and the substrate 22.

As the gelatin, acid-treated gelatin may be used other than lime-treated gelatin, and gelatin hydrolysate, an enzymatic decomposition product of gelatin, and gelatin modified with an amino group or a carboxyl group (phthalated gelatin or acetylated gelatin) can be used.

The volume ratio (volume of metal/volume of binder) of the metal and the binder in the fine conductive wire 34 is preferably 1.0 or higher, and even more preferably 1.5 or higher. When the volume ratio of the metal and the binder is 1.0 or higher, the conductive properties of the fine conductive wire 34 can be further increased. The upper limit is not particularly limited, but is preferably 6.0 or lower, even more preferably 4.0 or lower, and even more preferably 2.5 or lower from the viewpoint of productivity.

The volume ratio of the metal and the binder can be calculated from the densities of the metal and the binder contained in the fine conductive wire 34. For example, in a case where the metal is silver, the density of the silver is calculated to be 10.5 g/cm³, and in a case where the binder is gelatin, the density of the gelatin is calculated to be 1.34 g/cm³ to obtain the volume ratio.

The wire width of the fine conductive wire 34 is not particularly limited. However, from the viewpoint of relatively easily forming a low-resistance electrode, the wire width is preferably 30 µm or less, even more preferably 15 µm or less, even more preferably 10 µm or less, particularly preferably 9 µm or less, and most preferably 7 µm or less, and is preferably 0.5 µm or greater, and even more preferably 1 µm or greater.

The thickness of the fine conductive wire 34 is not particularly limited. However, from the viewpoint of conductive properties and visibility, the thickness can be selected within a range of 0.00001 to 0.2 mm, and is preferably 30 µm or less, even more preferably 20 µm or less, even more preferably 0.01 to 9 µm, and most preferably 0.05 to 5 µm.

The lattices 36 include opening regions surrounded by the fine conductive wires 34. A length W of one side of the lattice 36 is preferably 800 µm or less and even more preferably 600 µm or less, and still even more preferably 400 µm or less, preferably 5 µm or greater, even more preferably 30 µm or greater, and still even more preferably 80 µm or greater.

In the first detection electrodes 24 and the second detection electrodes 28, the opening ratio is preferably 85% or higher, more preferably 90% or higher, and even more preferably 95% or higher in view of the visible light transmittance. The opening ratio corresponds to a ratio of a transmissive portion excluding the fine conductive wires 34 in the first detection electrodes 24 or the second detection electrodes 28 in a predetermined region.

The lattices 36 have an almost diamond shape, but may have a polygonal shape (for example, triangular shape, quadrangular shape, hexagonal shape, or random polygonal shape) other than the diamond shape. In addition, one side may have a curved shape or an arc shape other than a linear shape. In the case of an arc shape, for example, two sides opposed to each other may have an outward convex arc shape, and other two sides opposed to each other may have an inward convex are shape. In addition, each side may have a wave line shape in which outward convex arcs and inward convex arcs are continued. Needles to say, each side may have the shape of a sine curve.

In FIG. 6, the fine conductive wires 34 are formed in a mesh pattern, but are not limited to this aspect. The wires may be formed in a stripe pattern.

In FIG. 4, the first detection electrodes 24 and the second detection electrodes 28 are formed to have a mesh structure of the fine conductive wires 34, but the invention is not limited to this aspect. For example, all of the first detection electrodes 24 and the second detection electrodes 28 may be formed of a metal oxide thin film (transparent metal oxide thin film) such as ITO or ZnO. The fine conductive wires 34 of the first detection electrodes 24 and the second detection electrodes 28 may be formed of metal oxide particles, a metal paste such as a silver paste or a copper paste, or metal nanowire particles such as silver nanowire or copper nanowire. Among these, in view of excellent conductive properties and transparency, fine silver wires are preferable.

Patterning of the electrode can be selected according to the materials of the electrode, and a photolithography method, a resist mask screen printing-etching method, an inkjet method, a printing method, and the like may be used.

The first lead-out wirings 26 and the second lead-out wirings 30 are members acting to apply a voltage to the first detection electrodes 24 and the second detection electrodes 28, respectively.

The first lead-out wiring 26 is disposed on the substrate 22 in the outside region $E_O$. One end thereof is electrically connected to the corresponding first detection electrode 24, and the other end is electrically connected to the flexible printed wiring board 32.

The second lead-out wiring 30 is disposed on the substrate 22 in the outside region $E_O$. One end thereof is electrically connected to the corresponding second detection electrode 28, and the other end is electrically connected to the flexible printed wiring board 32.

In FIG. 4, five first lead-out wirings 26 and five second lead-out wirings 30 are provided. However, the number is not particularly limited, and in general, a plurality of lead-out wirings are disposed according to the number of detection electrodes.

Examples of the material for forming the first lead-out wiring 26 and the second lead-out wiring 30 include metals such as gold (Au), silver (Ag), and copper (Cu), and metal oxides such as tin oxide, zinc oxide, cadmium oxide, gallium oxide, and titanium oxide. Among these, silver is preferable since excellent conductive properties are obtained.

The first lead-out wiring 26 and the second lead-out wiring 30 preferably contain a binder in view of more excellent adhesiveness with the substrate 22. The type of the binder is as described above.

The flexible printed wiring board 32 is a plate having a plurality of wires and terminals provided on a substrate, and is connected to the other end of each first lead-out wiring 26 and the other end of each second lead-out wiring 30 to act to connect the capacitive touch panel sensor 160 and an external device (for example, display device).

As the size of the input region of the capacitive touch panel sensor in which the contact of the object can be detected increases in the diagonal direction, the number of operation wires (the number of detection electrodes) increases. Therefore, time required for scanning a portion near the wires has to be compressed. In order to maintain a sensing environment appropriate for mobile use, an object of the invention is to reduce parasitic capacitance and a temperature change amount of a capacitive touch panel sensor. Temperature dependence of the relative dielectric constant is high, and there has been a concern in that a sensing program may not follow the input region (malfunction occurs) as the size increases on the pressure sensitive adhesive layer in the related art. Meanwhile, according to the invention, as the size of the input region (sensing part) of the capacitive touch panel sensor in which the contact of the object can be detected in the diagonal direction is 5 inches or greater, an appropriate sensing environment can be obtained. If the size is more preferably 8 inches or greater and even more preferably 10 inches or greater, it is possible to exhibit an excellent effect in the prevention of the malfunction. The input region having the above size has a rectangular shape.

(Method for Manufacturing Capacitive Touch Panel Sensor)

The method for manufacturing the capacitive touch panel sensor 160 is not particularly limited, and a known method can be employed. For example, a method in which a photo resist film on metal foil formed on both main surfaces of the substrate 22 is subjected to an exposure and development treatment to form a resist pattern, and the metal foil exposed from the resist pattern is subjected to etching is exemplified. In addition, a method in which a paste containing fine metal particles or metal nanowires is printed on both main surfaces of the substrate 22, and the paste is subjected to metal plating is exemplified. A forming method including printing using a screen printing plate or a gravure printing plate on the substrate 22, or an ink jet forming method is also exemplified.

Other than the above methods, a method using halogenated silver is also exemplified. Specifically, a method including a process (1) of forming a halogenated silver emulsion layer (hereinafter, also simply referred to as photosensitive layer) containing halogenated silver and a binder on both surfaces of the substrate 22, and a process (2) of subjecting the photosensitive layer to a development treatment after exposure is exemplified.

Hereinafter, the processes will be described.

[Process (1): Photosensitive Layer Forming Process]

The process (1) is a process of forming a photosensitive layer containing halogenated silver and a binder on both surfaces of the substrate 22.

The method for forming a photosensitive layer is not particularly limited. However, from the viewpoint of productivity, a method for forming a photosensitive layer on both surfaces of the substrate 22 by bringing a photosensitive layer forming composition containing halogenated silver and a binder into contact with the substrate 22 is preferable.

Hereinafter, an aspect of the photosensitive layer forming composition used in the method will be described in detail, and then the procedures of the process will be described in detail.

The photosensitive layer forming composition contains halogenated silver and a binder.

The halogen element contained in the halogenated silver may be any one of chlorine, bromine, iodine, and fluorine, or a mixture thereof. As the halogenated silver, for example, halogenated silver mainly containing silver chloride, silver bromide, or silver iodide is preferably used, and halogenated silver mainly containing silver bromide or silver chloride is even more preferably used.

The type of the binder to be used is as described above. The binder may be contained in a latex form in the photosensitive layer forming composition.

The volume ratio of the halogenated silver and the binder contained in the photosensitive layer forming composition is not particularly limited, and is appropriately adjusted to be within the above-described range of the preferable volume ratio of the metal and the binder in the fine conductive wire 34.

If necessary, the photosensitive layer forming composition contains a solvent.

Examples of the solvent to be used include water, organic solvents (for example, alcohols such as methanol, ketones such as acetone, amides such as formamide, sulfoxides such as dimethyl sulfoxide, esters such as ethyl acetate, ethers, and the like), ionic liquid, and mixed solvents thereof.

The content of the solvent to be used is not particularly limited, but is preferably 30 to 90 mass %, and more preferably 50 to 80 mass % with respect to the total mass of the halogenated silver and the binder.

(Procedures of Process)

The method for bringing the photosensitive layer forming composition into contact with the substrate 22 is not particularly limited, and a known method can be employed. Examples thereof include a method for applying the photosensitive layer forming composition to the substrate 22, and a method for dipping the substrate 22 in the photosensitive layer forming composition.

The content of the binder in the photosensitive layer to be formed is not particularly limited, but is preferably 0.3 to 5.0 $g/m^2$, and more preferably 0.5 to 2.0 $g/m^2$.

The content of the halogenated silver in the photosensitive layer is not particularly limited, but is preferably 1.0 to 20.0 $g/m^2$, and even more preferably 5.0 to 15.0 $g/m^2$ in terms of silver in view of more excellent conductive characteristics of the fine conductive wire 34.

If necessary, a protective layer formed of a binder may be further provided on the photosensitive layer. By providing the protective layer, scratches are prevented from being formed and mechanical characteristics are improved.

[Process (2): Exposure and Development Process]

The process (2) is a process of forming the first detection electrodes 24 and the first lead-out wirings 26, and forming the second detection electrodes 28 and the second lead-out wirings 30 by subjecting the photosensitive layer obtained in the process (1) to pattern exposure, and by then performing a development treatment thereon.

First, hereinafter, the pattern exposure treatment will be described in detail, and then the development treatment will be described in detail.

(Pattern Exposure)

The halogenated silver in the photosensitive layer in an exposure region forms a latent image by subjecting the photosensitive layer to pattern exposure. In the region where the latent image is formed, detection electrodes and leading-out wirings are formed by the development treatment to be described later. In an unexposed region where the exposure is not performed, the halogenated silver is dissolved and flows out from the photosensitive layer in a fixing treatment to be described later, and a transparent film is obtained.

The light source used during the exposure is not particularly limited, and examples thereof include light such as visible light rays and ultraviolet rays, and radiation such as X-rays.

The method for performing the pattern exposure is not particularly limited. For example, surface exposure using a photo mask, or scanning exposure using laser beams may be performed. The shape of the pattern is not particularly limited, and can be appropriately adjusted according to a fine conductive wire pattern to be formed.

(Development Treatment)

The development treatment method is not particularly limited, and a known method can be employed. For example, a usual development treatment technology which is used in a silver salt photographic film, printing paper, a film for printing plate making, an emulsion mask for photo masks, and the like can be used.

The type of a developer used in the development treatment is not particularly limited, but for example, a PQ developer, a MQ developer, a MAA developer, or the like can be used. In commercially available products, developers such as CN-16, CR-56, CP45X, FD-3, and PAPITOL available from Fujifilm Corporation and C-41, E-6, RA-4, D-19, and D-72 available from Eastman Kodak Company, or developers contained in kits thereof can be used. A lithographic developing solution can also be used.

The development treatment may include a fixing treatment which is performed for stabilization by removing the silver salt of the unexposed portion. For the fixing treatment, a fixing treatment technology which is used in a silver salt photographic film, printing paper, a film for printing plate making, an emulsion mask for photo masks, and the like can be used.

The fixing temperature in the fixing process is preferably 20° C. to 50° C., and more preferably 25° C. to 45° C. The fixing time is preferably 5 seconds to 1 minute, and more preferably 7 to 50 seconds.

The mass of the metal silver contained in the exposed portion (detection electrode and leading-out wirings) after the development treatment is preferably 50 mass % or higher, and more preferably 80 mass % or higher with respect to the mass of the silver contained in the exposed portion before the exposure. The mass of the silver contained in the exposed portion is preferably 50 mass % or higher with respect to the mass of the silver contained in the exposed portion before the exposure since high conductive properties can be obtained.

If necessary, the following undercoat forming process, antihalation layer forming process, or heating treatment may be performed other than the processes.

(Undercoat Forming Process)

Before the process (1), a process of forming an undercoat containing the binder on both surfaces of the substrate 22 is preferably performed since excellent adhesiveness is obtained between the substrate 22 and the halogenated silver emulsion layer.

The binder to be used is as described above. The thickness of the undercoat is not particularly limited, but is preferably 0.01 to 0.5 μm, and even more preferably 0.01 to 0.1 μm in view of adhesiveness and further suppression of the rate of change of the mutual capacitance.

(Antihalation Layer Forming Process)

A process of forming an antihalation layer on both surfaces of the substrate 22 is preferably performed before the process (1) from the viewpoint of thinning of the fine conductive wires 34.

(Process (3): Heating Process)

A process (3) is performed if necessary, and is a process of performing a heating treatment after the development treatment. By performing this process, fusion occurs between binders, and thus the hardness of the detection electrodes and the leading-out wirings further increases. Particularly, in a case where polymer particles are dispersed as a binder in the photosensitive layer forming composition (in a case where polymer particles in latex correspond to a binder), fusion occurs between polymer particles by performing this process, and thus the detection electrodes and the leading-out wirings exhibiting desired hardness are formed.

Regarding conditions of the heating treatment, preferable conditions are appropriately selected according to the binder to be used, but from the viewpoint of the film forming temperature of the polymer particles, 40° C. or higher is preferable, 50° C. or higher is more preferable, and 60° C. or higher is even more preferable. From the viewpoint of suppression of a curl of the substrate, 150° C. or lower is preferable, and 100° C. or lower is more preferable.

The heating time is not particularly limited, but is preferably 1 to 5 minutes, and more preferably 1 to 3 minutes from the viewpoint of productivity and suppression of a curl of the substrate.

In general, the heating treatment can also be performed as a drying process to be performed after the exposure and development treatment, and this is excellent from the viewpoint of productivity and cost since there is no need to add a new process to form a film of the polymer particles.

By performing the process, a light-transmitting portion containing the binder is formed between the detection electrodes (the fine conductive wires 34) and between leading-out wirings. The transmittance in the light-transmitting portion (transmittance indicated by a minimum value of the transmittance in a wavelength range of 380 to 780 nm) is preferably 90% or higher, more preferably 95% or higher, even more preferably 97% or higher, particularly preferably 98% or higher, and most preferably 99% or higher.

The light-transmitting portion may contain a material other than the binder. Examples of the material include a silver-hardly-soluble agent.

The aspect of the capacitive touch panel sensor is not limited to the aspect of FIG. 4, and the capacitive touch panel sensor may have other aspects.

Figure 7:
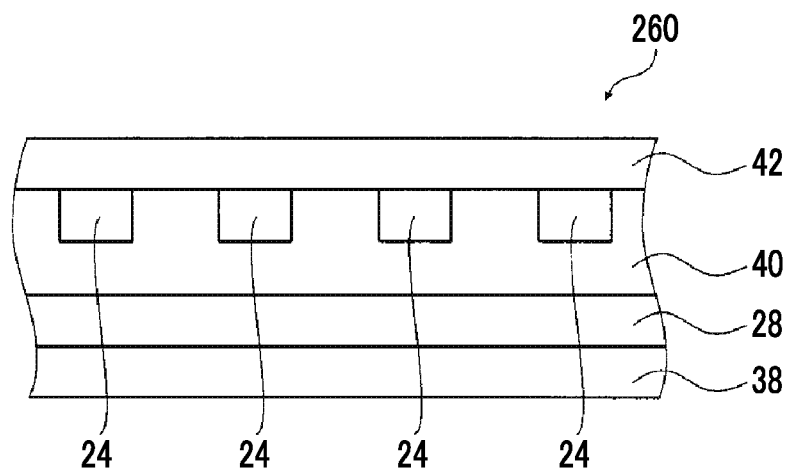
FIG. 7 is a partial cross-section of another embodiment of the capacitive touch panel sensor.

For example, as shown in FIG. 7, a capacitive touch panel sensor 260 comprises a first substrate 38, second detection electrodes 28 which are disposed on the first substrate 38, second lead-out wirings (not shown), each of which is electrically connected to one end of the second detection electrode 28 and is disposed on the first substrate 38, a pressure sensitive adhesive layer 40, first detection electrodes 24, first lead-out wirings (not shown), each of which is electrically connected to one end of the first detection electrode 24, a second substrate 42 to which the first detection electrodes 24 and the first lead-out wirings are adjacent, and a flexible printed wiring board (not shown).

As shown in FIG. 7, since the capacitive touch panel sensor 260 has a configuration similar to that of the capacitive touch panel sensor 160, except for the first substrate 38, the second substrate 42, and the pressure sensitive adhesive layer 40, the same constituent elements will be denoted by the same references, and descriptions thereof will be omitted.

The definition of the first substrate 38 and the second substrate 42 is the same as that of the above-described substrate 22.

The pressure sensitive adhesive layer 40 is a layer for bringing the first detection electrodes 24 and the second detection electrodes 28 into close contact with each other, and is preferably optically transparent (is preferably a transparent pressure sensitive adhesive layer). A known material may be used as a material of the pressure sensitive adhesive layer 40.

The number of each of the first detection electrode 24 and the second detection electrode 28 in FIG. 7 is more than one as shown in FIG. 4, and both of them are disposed to be perpendicular to each other as shown in FIG. 4.

The capacitive touch panel sensor 260 shown in FIG. 7 corresponds to a capacitive touch panel sensor which has two substrates with electrodes attached thereto, each substrate with electrodes attached thereto having a substrate, and detection electrodes and lead-out wirings disposed on a surface of the substrate, and is obtained by sticking the substrates to each other via a pressure sensitive adhesive layer so that the electrodes face to each other.

Figure 8:
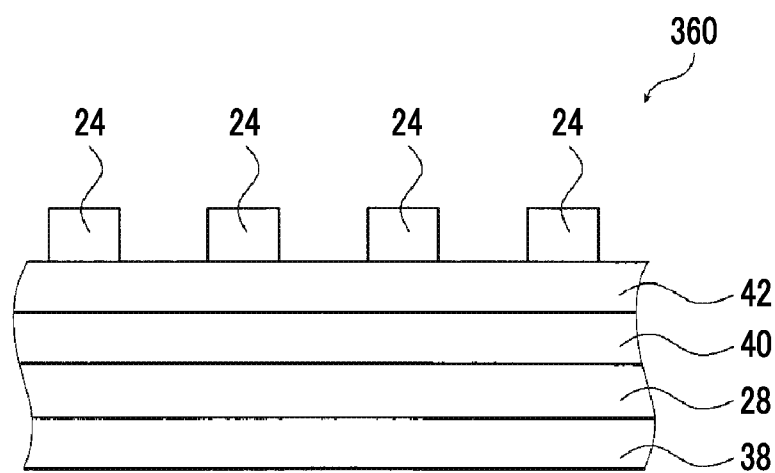
FIG. 8 is a partial cross-section of still another embodiment of the capacitive touch panel sensor.

An aspect shown in FIG. 8 is exemplified as another aspect of the capacitive touch panel sensor.

A capacitive touch panel sensor 360 includes a first substrate 38, second detection electrodes 28 which are disposed on the first substrate 38, second lead-out wirings (not shown), each of which is electrically connected to one end of the second detection electrode 28 and is disposed on the first substrate 38, a pressure sensitive adhesive layer 40, a second substrate 42, first detection electrodes 24 which are disposed on the second substrate 42, first lead-out wirings (not shown), each of which is electrically connected to one end of the first detection electrode 24 and is disposed on the second substrate 42, and a flexible printed wiring board (not shown).

Since the capacitive touch panel sensor 360 shown in FIG. 8 has layers similar to those of the capacitive touch panel sensor 260 shown in FIG. 7, except that the order of the layers is different, the same constituent elements will be denoted by the same references, and descriptions thereof will be omitted.

The number of each of the first detection electrode 24 and the second detection electrode 28 in FIG. 8 is more than one as shown in FIG. 4, and both of them are disposed to be perpendicular to each other as shown in FIG. 4.

The capacitive touch panel sensor 360 shown in FIG. 8 corresponds to a capacitive touch panel sensor which has two substrates with electrodes attached thereto, each substrate with electrodes attached thereto having a substrate, and detection electrodes and lead-out wirings disposed on a surface of the substrate, and is obtained by sticking the substrates to each other via a pressure sensitive adhesive layer so that the substrate of one substrate with electrodes attached thereto and the electrodes of the other substrate with electrodes attached thereto face to each other.

(Method for Manufacturing Touch Panel)

The method for manufacturing the capacitive touch panel 10 above is not particularly limited, and known methods can be employed.

First, examples of the method for forming the upper pressure sensitive adhesive layer 18 on the capacitive touch panel sensor 16 include a method for sticking a pressure sensitive adhesive layer sheet (so-called transparent pressure sensitive adhesive film (OCA: optically clear adhesive film)) on the capacitive touch panel sensor 16 and a method for coating the capacitive touch panel sensor 16 with the liquid pressure sensitive adhesive composition (so-called UV hardening-type adhesive agent or transparent adhesive agent (OCR: optically clear adhesive resin)) and performing a hardening treatment, if necessary. The pressure sensitive adhesive layer sheet and the pressure sensitive adhesive composition to be used are not particularly limited, as long as the upper pressure sensitive adhesive layer 18 satisfies the characteristics described above.

Subsequently, the protective substrate 20 is stuck to the upper pressure sensitive adhesive layer 18 disposed on the capacitive touch panel sensor 16. As the sticking method, known methods can be employed.

Subsequently, a method for forming the upper pressure sensitive adhesive layer 18 can be used as a method for forming the lower pressure sensitive adhesive layer 14 on the capacitive touch panel sensor 16.

Subsequently, a desired touch panel can be manufactured by sticking the display device 12 on the lower pressure sensitive adhesive layer 14.

The method for forming respective layers from the capacitive touch panel sensor 16 is described above, but the invention is not limited thereto. For example, a desired touch panel can be manufactured, by first preparing a laminate A comprising the capacitive touch panel sensor 16, the lower pressure sensitive adhesive layer 14, and the display device 12, separately preparing a laminate B comprising the protective substrate 20 and the upper pressure sensitive adhesive layer 18, and sticking the laminate A and the laminate B.

A pressurizing and defoaming treatment and sticking under vacuum environment can be appropriately performed.

The size of the capacitive touch panel is not particularly limited. However, according to the demand for increase in the size of a screen, the size of the display surface (which is the same as an input region (sensing portion) of the capacitive touch panel sensor in which contact with an object can be detected) of the display device in the diagonal direction is preferably 5 inches or greater and more preferably 10 inches or greater. In the touch panel according to the invention, malfunction hardly occurs even in the size described above. In general, according to the size of the display image in the diagonal direction, the size of the input region of the capacitive touch panel sensor in which the contact of the object can be detected in the diagonal direction changes. The input region having the above size has a rectangular shape.

Particularly, even in a case where the display surface is large (in a case where the size in the diagonal direction is 5 inches or greater), malfunction caused by the change of the environment hardly occurs in the touch panel according to the invention. Generally, if the size of the display surface increases, driving frequency (number of times of scanning) increases or electrostatic capacitance decreases, and, as a result, parasitic capacitance of the pressure sensitive adhesive layer increases, and thus malfunction easily occurs. However, since the touch panel of the invention has smaller variation of relative dielectric constants of the pressure sensitive adhesive layer, even in a case where the display surface is large, deviation from the value of the initially determined electrostatic capacitance is small, and malfunction hardly occurs.

EXAMPLES

Hereinafter, the invention will be described in more detail with examples, but is not limited thereto.

Synthesis Example 1

21.8 parts by mass of an esterified product between a maleic anhydride adduct of a polyisoprene polymer and 2-hydroxyethyl methacrylate (Product name: UC102, manufactured by Kuraray Co., Ltd., Molecular weight: 19,000), 8.8 parts by mass of polybutadiene (Product name: Polyvest110, manufactured by Evonik Industries AG), 20 parts by mass of isobornyl acrylate (manufactured by Tokyo Chemical Industry Co., Ltd.), 5 parts by mass of 2-ethylhexyl acrylate (manufactured by Wako Pure Chemical Industries, Ltd.), 2.6 parts by mass of dodecanethiol (manufactured by Tokyo Chemical Industry Co., Ltd.), 38.8 parts by mass of a terpene-based hydrogenated resin (Product name: CLEARON P-135, manufactured by Yasuhara Chemical Co., Ltd.) were kneaded with a kneader in a constant-temperature tank at 130° C., a temperature of the constant-temperature tank was subsequently adjusted to 80° C., 3 parts by mass of a photopolymerization initiator (Product name: Lucirin TPO, manufactured by BASF SE) was introduced, and kneading was performed with a kneader, so as to prepare a pressure sensitive adhesive 1.

A surface-treated surface of a peeling film (heavy peeling film) having a thickness of 75 μm was coated with the obtained pressure sensitive adhesive 1 such that the thickness of the formed pressure sensitive adhesive layer became a thickness of 75 μm, a surface-treated surface of a peeling film (light peeling film) having a thickness of 50 μm was stuck to the obtained coating film. The coating film interposed between the peeling films was irradiated with UV light having irradiation energy of 1 J/cm$^2$ by using a metal halide UV lamp (manufactured by Heraeus Noblelight America LLC.), so as to obtain a pressure sensitive adhesive film 1 comprising the pressure sensitive adhesive layer interposed between two sheets of peeling films. In the same method, the pressure sensitive adhesive film 1 in which the thickness of a pressure sensitive adhesive layer is 200 μm was manufactured.

Synthesis Example 2

66 parts by mass of 2-ethylhexyl acrylate (2EHA), 27 parts by mass of N-vinyl-2-pyrrolidone (NVP), and 0.1 parts by mass of a photopolymerization initiator (Product name: IRGACURE 184, manufactured by BASF SE) were introduced to a four-neck flask, so as to prepare a monomer mixture. Subsequently, a monomer mixture was exposed to ultraviolet rays under the nitrogen atmosphere so as to partially perform photopolymerizing the monomer mixture so as to obtain a partial polymerization product having a polymerization rate of about 10 mass % (acrylic polymer syrup).

7 parts by mass of an isobutylene rubber and 0.05 parts by mass of dipentaerythritol pentaacrylate (Product name: "KAYARAD DPHA", manufactured by Nippon Kayaku Co., Ltd.) were added to a total amount of the obtained acrylic polymer syrup, and these were evenly mixed, so as to prepare a pressure sensitive adhesive composition.

Subsequently, a peeling-treated surface of a polyester film (Product name: DIAFOIL MRF, manufactured by Mitsubishi Plastics, Inc.) having a thickness of 38 μm of which one surface is subjected to a peeling treatment with silicone was coated with the pressure sensitive adhesive composition prepared as described above such that the thickness of the obtained pressure sensitive adhesive layer became 75 μm, so as to form a coating layer. Subsequently, a surface of the coating layer was covered with a polyester film (Product name: DIAFOIL MRF, manufactured by Mitsubishi Plastics, Inc.) having a thickness of 38 μm of which one surface is subjected to a peeling treatment with silicone such that the peeling-treated surface of the film became on the coating layer side. Accordingly, the coating layer was blocked from oxygen. The film having the coating layer obtained in this manner was irradiated for 360 seconds with ultraviolet ray having illuminance of 5 mW/cm$^2$ (measured by TOPCON UVR-T1 having maximum sensitivity at about 350 nm) by using a chemical light lamp (manufactured by Toshiba Corporation), and the coating layer was hardened, so as to manufacture a pressure sensitive adhesive film 2 comprising a pressure sensitive adhesive layer interposed between two sheets of peeling films. The polyester films that covered the both surfaces of the pressure sensitive adhesive layer functioned as peeling liners. In the same method, the pressure sensitive adhesive film 2 in which the thickness of the pressure sensitive adhesive layer was 200 μm was also manufactured.

Synthesis Example 3

A pressure sensitive adhesive film 3 was manufactured in the same method except for causing the content of an isobutylene rubber to be 14 parts by mass in Synthesis Example 2.

Synthesis Example 4

An acryl copolymer of a monomer including acrylic acid ester having an ultraviolet crosslinkable portion was synthesized. Specifically, a solution was prepared such that BA (n-butyl acrylate)/IBXA (isobornyl acrylate)/HEA (2-hydroxyethyl acrylate)/AEBP (4-acryloyloxyethoxy benzophenone)=50.0/25.0/25.0/0.20 (parts by mass) was satisfied and diluted with methyl ethyl ketone (MEK) such that the monomer concentration became 40 mass %. As an initiator, V-65 was added to a monomer component so as to be 0.4 mass %, and nitrogen purge was performed for 10 minutes. Subsequently, reaction was performed for 24 hours in a constant-temperature tank of 50° C., so as to obtain a transparent viscous solution (polymerization solution).

Subsequently, a peeling film (heavy peeling surface of CERAPEEL MIB (T) manufactured by Toray Advanced Film Co., Ltd.) having a thickness of 50 μm was coated with this polymerization solution, with a gap of a knife coater adjusted to 600 μm, and drying was performed in an oven of 100° C. for 8 minutes. The thickness of the pressure sensitive adhesive layer after drying was 200 μm. Subsequently, a peeling film (PUREX (Registered trademark) A-31 manufactured by Teijin DuPont Films) having a thickness of 38 μm was laminated on the pressure sensitive adhesive layer, so as to obtain a pressure sensitive adhesive film 4 comprising a pressure sensitive adhesive layer interposed between two peeling films. In the same manner, coating was performed by adjusting a gap of a knife coater to 225 μm, so as to also manufacture the pressure sensitive adhesive film 4 in which the thickness of the pressure sensitive adhesive layer after drying was 75 μm.

Synthesis Example 5

0.3 parts by mass of a tolylene diisocyanate-based compound (manufactured by Nippon Polyurethane Industry Co., Ltd., CORONATE L) as a crosslinking agent, 0.7 parts by mass of pentaerythritol-tetrakis(3-(3,5-di-t-butyl-4-hydroxyphenyl)propionate) (manufactured by BASF Japan K.K., IRGANOX 1010) as a hindered phenol-based antioxidant, and 0.5 parts by mass of tris(2,4-di-t-butylphenyl) phosphite (manufactured by BASF Japan K.K., IRGAFOS 168) as a phosphorus-based antioxidant were blended to 100 parts by mass of the main agent of an acryl-based pressure sensitive adhesive agent having 4.5 mass % of an 4-hydroxybutyl acrylate unit (4-HBA), 60 mass % of an butyl acrylate unit, and 35.5 mass % of an methyl acrylate unit, so as to obtain a composition (carboxy group-containing ratio: 0 mass %).

A first peeling film [manufactured by Oji F-Tex Co., Ltd., 38 μRL-07(2)] provided with a release agent layer on one surface of a polyethylene terephthalate film was coated with the obtained composition using a knife coater, heating was performed at 100° C. for 3 minutes, so as to form a pressure sensitive adhesive layer (thickness: 200 μm).

A second peeling film [manufactured by Oji F-Tex Co., Ltd., 38 μRL-07(L)] provided with a release agent layer having peeling properties higher than the first peeling film on one side of the polyethylene terephthalate film was stuck to the pressure sensitive adhesive layer, so as to obtain a pressure sensitive adhesive film 5 having a pressure sensitive adhesive layer interposed between two peeling films.

Examples 1 to 9 and Comparative Examples 1 to 3

(Preparation of Halogenated Silver Emulsion)

To the following liquid 1 kept at 38° C. at pH 4.5, the following liquid 2 and liquid 3 were simultaneously added for over 20 minutes under stirring in amounts of 90%, respectively, and thus nuclear particles of 0.16 μm were formed. Next, the following liquid 4 and liquid 5 were added for over 8 minutes, and the last 10% of the following liquid 2 and liquid 3 were added for over 2 minutes, respectively, to grow the particles up to 0.21 μm. 0.15 g of potassium iodide was added, the mixture was aged for 5 minutes, and the formation of the particles was completed.

| Liquid 1: | |
|---|---|
| Water | 750 ml |
| Gelatin | 9 g |
| Sodium chloride | 3 g |
| 1,3-dimethylimidazolidine-2-thione | 20 mg |
| Sodium benzene thiosulfonate | 10 mg |
| Citric Acid | 0.7 g |
| Liquid 2: | |
| Water | 300 ml |
| Silver nitride | 150 g |
| Liquid 3: | |
| Water | 300 ml |
| Sodium chloride | 38 g |
| Potassium bromide | 32 g |
| Potassium hexachloroiridate (III) (0.005% KCl, 20% aqueous solution) | 8 ml |
| Ammonium hexachlororhodate (0.001% NaCl 20% aqueous solution) | 10 ml |
| Liquid 4: | |
| Water | 100 ml |
| Silver nitride | 50 g |
| Liquid 5: | |
| Water | 100 ml |
| Sodium chloride | 13 g |
| Potassium Bromide | 11 g |
| Yellow prussiate of potash | 5 mg |

Thereafter, the particles were rinsed in the usual manner through a flocculation method. Specifically, the temperature was reduced to 35° C., and the pH was reduced (pH 3.6±0.2) using a sulfuric acid until the halogenated silver was precipitated. Next, about 3 L of the supernatant was removed (first rinsing). 3 L of distilled water was added, and then a sulfuric acid was added until the halogenated silver was precipitated. 3 L of the supernatant was removed again (second rinsing). The same operation as the second rinsing was repeated once again (third rinsing), and the rinsing/desalination process was completed. The pH and the pAg of the emulsion after the rinsing and desalination were adjusted to 6.4 and 7.5, respectively, and 3.9 g of gelatin, 10 mg of sodium benzene thiosulfonate, 3 mg of sodium benzene thiosulfinate, 15 mg of sodium thiosulfate, and 10 mg of a chlorauric acid were added to perform chemical sensitization so as to obtain the optimum sensitivity at 55° C. 100 mg of 1,3,3a,7-tetraazaindene as a stabilizer and 100 mg of PROXEL (trade name, manufactured by ICI Co., Ltd.) as a preservative were added. The finally obtained emulsion was a cubic silver iodochlorobromide particle emulsion containing 0.08 mole % of silver iodide and having a silver chloride-bromide ratio of 70 mole % of silver chloride and 30 mole % of silver bromide, an average particle size of 0.22 µm, and a coefficient of variation of 9%.

(Preparation of Photosensitive Layer Forming Composition)

$1.2 \times 10^{-4}$ mole/moleAg of 1,3,3a,7-tetraazaindene, $1.2 \times 10^{-2}$ mole/moleAg of hydroquinone, $3.0 \times 10^{-4}$ mole/moleAg of a citric acid, and 0.90 g/moleAg of 2,4-dichloro-6-hydroxy-1,3,5-triazine sodium salt were added to the emulsion, and the pH of the coating liquid was adjusted to 5.6 using a citric acid. Thus, a photosensitive layer forming composition was obtained.

(Photosensitive Layer Forming Process)

A polyethylene terephthalate (PET) film having a thickness of 100 µm was subjected to a corona discharge treatment, and then a gelatin layer as an undercoat having a thickness of 0.1 µm was provided on both surfaces of the PET film, and an antihalation layer having an optical density of about 1.0 and containing a dye to be decolorized with alkali of a developer was provided on the undercoat. The photosensitive layer forming composition was applied to the antihalation layer, and a gelatin layer having a thickness of 0.15 µm was provided thereon, whereby a PET film having a photosensitive layer formed on both surfaces was obtained. The obtained film is set as a film A. The formed photosensitive layer had a silver amount of 6.0 g/m$^2$ and a gelatin amount of 1.0 g/m$^2$.

(Exposure and Development Process)

Both surfaces of the film A were exposed using parallel light with a high pressure mercury lamp as a light source via a photo mask in which detection electrodes (first detection electrodes and second detection electrodes) and lead-out wirings (first lead-out wirings and second lead-out wirings) were arranged as shown in FIG. 4. After the exposure, development was performed with a developer as described below, and a development treatment was further performed using a fixing liquid (trade name: N3X-R for CN16X manufactured by Fujifilm Corporation). By performing rinsing with pure water and drying, a capacitive touch panel sensor including the detection electrodes composed of fine Ag wires and the lead-out wirings provided on both surfaces was obtained.

In the obtained capacitive touch panel sensor, the detection electrodes are composed of fine conductive wires intersecting in a mesh state. As described above, the first detection electrodes are electrodes extending in the X-direction, and the second detection electrodes are electrodes extending in the Y-direction. The first detection electrodes and the second detection electrodes are disposed on the film at a pitch of 4.5 to 5.0 mm, respectively.

Next, a touch panel including a liquid crystal display device, a lower pressure sensitive adhesive layer, a capacitive touch panel sensor, an upper pressure sensitive adhesive layer, and a glass substrate was manufactured. In addition, in the respective examples and comparative examples, types of the pressure sensitive adhesive films used at the time of manufacturing the lower pressure sensitive adhesive layer and the upper pressure sensitive adhesive layer and the size of the display surface are collectively presented in Table 1 below.

First, as the method for manufacturing a touch panel, when an upper pressure sensitive adhesive layer was stuck to a capacitive touch panel sensor, a peeling film on one side of a pressure sensitive adhesive film cut into a predetermined size was removed, the pressure sensitive adhesive layer was bonded to a capacitive touch panel sensor, and pressing was performed by using a roller having a weight of 2 kg. A peeling film on the other side was removed, a glass protective substrate in the same size was stuck to the upper pressure sensitive adhesive layer by using a commercially available sticking device (manufactured by FUK Co., Ltd.) such that a pushing amount was a total thickness of a thickness of the pressure sensitive adhesive layer and a thickness of the capacitive touch panel sensor, a pushing pressure was 100 kPa, and a sticking speed was 30 mm/sec.

For sticking the capacitive touch panel sensor and the liquid crystal display device (display surface: size of a diagonal line was 10 inches), the same method using the commercially available sticking device was performed.

After the pressure sensitive adhesive layer was stuck, an autoclave treatment at 60° C. in 5 atmospheric pressure for 20 minutes was performed each time, so as to manufacture a touch panel.

FPC was included in the capacitive touch panel sensor used above.

When the pressure sensitive adhesive films 1 to 5 were used, in a case of being used for manufacturing the lower pressure sensitive adhesive layer, pressure sensitive adhesive layer s having a thickness of 200 µm were used, and in a case of being used for manufacturing the upper pressure sensitive adhesive layer, the pressure sensitive adhesive layers having a thickness of 75 µm were used.

(Manufacturing Sample for Temperature Dependency Evaluation Test)

Samples for the temperature dependency evaluation test were manufactured by using the pressure sensitive adhesive films (Thickness of pressure sensitive adhesive layer: 200 µm) manufactured in Synthesis Examples 1 to 5.

Specifically, a peeling film on one side of one pressure sensitive adhesive film cut into a predetermined size (vertically 20 mm×horizontally 20 mm) was removed, the pressure sensitive adhesive layer was stuck to an aluminum electrode (vertically 20 mm×horizontally 20 mm, thickness: 0.5 mm), a peeling film on the other side was removed afterwards, the pressure sensitive adhesive layer was stuck to another aluminum electrode (vertically 20 mm×horizontally 20 mm, thickness: 0.5 mm), and a pressurizing and defoaming treatment was performed in 5 atmospheric pressure, at 40° C. for 60 minutes, so as to manufacture a sample in which the pressure sensitive adhesive layer was interposed between aluminum electrodes.

(Method for Temperature Dependency Evaluation Test)

Impedance measurement was performed at 1 MHz with an impedance analyzer (4294A manufactured by Manufactured by Agilent Technologies), by using the sample for temperature dependency evaluation test which was produced as above, so as to measure a relative dielectric constant of the pressure sensitive adhesive layer.

Specifically, the temperature of the sample for the temperature dependency evaluation test was increased to 20° C. and to 40° C. in stages, so as to obtain the capacitance C by the impedance measurement at 1 MHz with employing an impedance analyzer (4294A manufactured by manufactured by Agilent Technologies) at the respective temperatures. At the respective temperatures, the sample was stood still for 5 minutes, until the temperature of the sample became constant.

Thereafter, relative dielectric constants at respective temperatures were calculated from Equation (X) below, by using the obtained capacitance C.

Relative dielectric constant=(Capacitance $C$×Thickness $T$)/(Size $S$×Dielectric constant $\varepsilon_0$ in vacuum)   Equation (X):

The thickness T refers to a thickness of the pressure sensitive adhesive layer, the size S refers to a size of an aluminum electrode (vertically 20 mm×horizontally 20 mm), and a dielectric constant in vacuum refers to a physical constant ($8.854 \times 10^{-12}$ F/m).

Among the calculated relative dielectric constant at 20° C. and the calculated relative dielectric constant at 40° C., one having a smaller value is set to a minimum value and one having a greater value is set to a maximum value, so as to obtain temperature dependence (%) from Expression [(maximum value−minimum value)/minimum value×100].

The adjustment of the temperature was performed by using a liquid nitrogen cooling stage in the case of the low temperature and a hot plate in the case of the high temperature.

(Malfunction Evaluation Method)

After the touch panel manufactured above was left alone for 24 hours in an environment of 20° C., one arbitrary point (point A) of the touch surface on the protective substrate of the touch panel in an environment of 20° C. was touched for 5 minutes and was separated, and the point A was touched again, so as to check whether malfunction occurs. This method was repeated 100 times, to measure a malfunction incidence rate (%) [(number of times of abnormal reaction/100)×100] of the touch panel from the number of times of abnormal reaction.

A case where the malfunction incidence rate (%) was 5% or less was evaluated as "A", and a case where the malfunction incidence rate (%) was greater than 5% was evaluated as "B".

In the section of "difference between temperature dependence" in Table 1 refers to a difference between temperature dependence of a relative dielectric constant of a lower pressure sensitive adhesive layer and temperature dependence of a relative dielectric constant of an upper pressure sensitive adhesive layer.

Films 1 to 5 in a section of "type of pressure sensitive adhesive film" respectively refer to the pressure sensitive adhesive film 1 to 5.

TABLE 1

| | Upper pressure sensitive adhesive layer | | | | Lower pressure sensitive adhesive layer | | | | | |
|---|---|---|---|---|---|---|---|---|---|---|
| | Type of adhesive film | Relative dielectic constant at 20° C. | Relative dielectric constant at 40° C. | Temperature dependence of relative dielectric constant (%) | Type of adhesive film | Relative dielectric constant at 20° C. | Relative dielectric constant at 40° C. | Temperature dependence of relative dielectric constant (%) | Difference of temperature dependence | Malfunction incidence rate (%) | Malfunction evaluation |
| Example 1 | Film 1 | 2.67 | 2.71 | 1.5 | Film 1 | 2.67 | 2.71 | 1.5 | 0 | 0 | A |
| Example 2 | Film 1 | 2.67 | 2.71 | 1.5 | Film 2 | 3.02 | 3.22 | 6.6 | 5.1 | 2 | A |
| Example 3 | Film 2 | 3.02 | 3.22 | 6.6 | Film 2 | 3.02 | 3.22 | 6.6 | 0 | 3 | A |
| Example 4 | Film 3 | 2.94 | 3.07 | 4.4 | Film 2 | 3.02 | 3.22 | 6.6 | 2.2 | 2 | A |
| Example 5 | Film 1 | 2.67 | 2.71 | 1.5 | Film 3 | 2.94 | 3.07 | 4.4 | 2.9 | 1 | A |
| Example 6 | Film 3 | 2.94 | 3.07 | 4.4 | Film 3 | 2.94 | 3.07 | 4.4 | 0 | 1 | A |
| Example 7 | Film 1 | 2.67 | 2.71 | 1.5 | Film 4 | 3.87 | 4.29 | 10.9 | 9.4 | 3 | A |

TABLE 1-continued

| | Upper pressure sensitive adhesive layer | | | | Lower pressure sensitive adhesive layer | | | | | |
|---|---|---|---|---|---|---|---|---|---|---|
| | Type of adhesive film | Relative dielectic constant at 20° C. | Relative dielectic constant at 40° C. | Temperature dependence of relative dielectic constant (%) | Type of adhesive film | Relative dielectic constant at 20° C. | Relative dielectic constant at 40° C. | Temperature dependence of relative dielectic constant (%) | Difference of temperature dependence | Malfunction incidence rate (%) | Malfunction evaluation |
| Example 8 | Film 2 | 3.02 | 3.22 | 6.6 | Film 4 | 3.87 | 4.29 | 10.9 | 4.3 | 5 | A |
| Example 9 | Film 3 | 2.94 | 3.07 | 4.4 | Film 4 | 3.87 | 4.29 | 10.9 | 6.5 | 4 | A |
| Comparative Example 1 | Film 4 | 3.87 | 4.29 | 10.9 | Film 4 | 3.87 | 4.29 | 10.9 | 0 | 10 | B |
| Comparative Example 2 | Film 4 | 3.87 | 4.29 | 10.9 | Film 2 | 3.02 | 3.22 | 6.6 | 4.3 | 8 | B |
| Comparative Example 3 | Film 1 | 2.67 | 2.71 | 1.5 | Film 5 | 5.75 | 6.43 | 11.8 | 10.3 | 6 | B |

As illustrated in Table 1, in the touch panel according to the invention, malfunction hardly occurs even after a finger of an operator was touched for a long period of time in a normal temperature environment.

Among these, according to a comparison between Examples 1 and 2, it was checked that, in a case where a difference between temperature dependence of a relative dielectric constant of an upper pressure sensitive adhesive layer and temperature dependence of a relative dielectric constant of a lower pressure sensitive adhesive layer was 5.0% or less, malfunction occurs more hardly.

According to a comparison between Examples 3 and 4, it was checked that, in a case where temperature dependence of a relative dielectric constant of an upper pressure sensitive adhesive layer was 5.0% or less, malfunction occurs more hardly.

Meanwhile, in Comparative Examples 1 and 2 in which temperature dependence of relative dielectric constants of upper pressure sensitive adhesive layers was greater than 10.0%, and Comparative Example 3 in which a difference between temperature dependence of a relative dielectric constant of an upper pressure sensitive adhesive layer and temperature dependence of a relative dielectric constant of a lower pressure sensitive adhesive layer was greater than 10.0%, a desired effect was not able to be obtained.

EXPLANATION OF REFERENCES 10 capacitive touch panel
12 display device
14 lower pressure sensitive adhesive layer
16, 260, 360 capacitive touch panel sensor
18 upper pressure sensitive adhesive layer
20 protective substrate
22 substrate
24 first detection electrode
26 first lead-out wiring
28 second detection electrode
30 second lead-out wiring
32 flexible printed wiring board
34 fine conductive wire
36 lattice
38 first substrate
40 pressure sensitive adhesive layer
42 second substrate
100 aluminum electrode

What is claimed is:

1. A capacitive touch panel comprising:
a display device;
a lower pressure sensitive adhesive layer;
a capacitive touch panel sensor;
an upper pressure sensitive adhesive layer; and
a protective substrate, in this order,
wherein temperature dependence of a relative dielectric constant of the upper pressure sensitive adhesive layer which is obtained by a temperature dependency evaluation test described below is 10.0% or less,
temperature dependence of a relative dielectric constant of the lower pressure sensitive adhesive layer which is obtained by the temperature dependency evaluation test described below is equal to or greater than the temperature dependence of the relative dielectric constant of the upper pressure sensitive adhesive layer, and
a difference between the temperature dependence of the relative dielectric constant of the lower pressure sensitive adhesive layer and the temperature dependence of the relative dielectric constant of the upper pressure sensitive adhesive layer is within 10.0%, and
wherein the temperature dependency evaluation test comprises: an pressure sensitive adhesive layer is interposed between an aluminum electrode, a relative dielectric constant of the pressure sensitive adhesive layer is calculated by impedance measurement at 1 MHz at 20° C. and 40° C.; among the relative dielectric constant of the pressure sensitive adhesive layer at 20° C. and the relative dielectric constant of the pressure sensitive adhesive layer at 40° C., a greater one is set to be a maximum value and a smaller one is set to be a minimum value; a value (%) obtained from an equation [(maximum value-minimum value)/minimum value×100] is set to be the temperature dependence; and in a case where the relative dielectric constant of the pressure sensitive adhesive layer at 20° C. and the relative dielectric constant of the pressure sensitive adhesive layer at 40° C. have the same value, the temperature dependence is 0%.

2. The capacitive touch panel according to claim 1, wherein the relative dielectric constant of the lower pressure sensitive adhesive layer at 20° C. is 2.20 or greater and 4.50 or less.

3. The capacitive touch panel according to claim 1,
wherein the relative dielectric constant of the upper pressure sensitive adhesive layer at 20° C. is 2.20 or greater and 3.50 or less.

4. The capacitive touch panel according to claim 1,
wherein the temperature dependence of the relative dielectric constant of the upper pressure sensitive adhesive layer is 5% or less.

5. The capacitive touch panel according to claim 2,
wherein the temperature dependence of the relative dielectric constant of the upper pressure sensitive adhesive layer is 5% or less.

6. The capacitive touch panel according to claim 1,
wherein the difference between the temperature dependence of the relative dielectric constant of the lower pressure sensitive adhesive layer and the temperature dependence of the relative dielectric constant of the upper pressure sensitive adhesive layer is within 5%.

7. The capacitive touch panel according to claim 2,
wherein the difference between the temperature dependence of the relative dielectric constant of the lower pressure sensitive adhesive layer and the temperature dependence of the relative dielectric constant of the upper pressure sensitive adhesive layer is within 5%.

8. The capacitive touch panel according to claim 5,
wherein the difference between the temperature dependence of the relative dielectric constant of the lower pressure sensitive adhesive layer and the temperature dependence of the relative dielectric constant of the upper pressure sensitive adhesive layer is within 5%.

9. The capacitive touch panel according to claim 1,
wherein the capacitive touch panel sensor is a laminate comprising detection electrodes on both surfaces of the substrate or a laminate obtained by sticking substrates with detection electrodes comprising detection electrodes on one surface thereof via a pressure sensitive adhesive layer.

10. The capacitive touch panel according to claim 2,
wherein the capacitive touch panel sensor is a laminate comprising detection electrodes on both surfaces of the substrate or a laminate obtained by sticking substrates with detection electrodes comprising detection electrodes on one surface thereof via a pressure sensitive adhesive layer.

11. The capacitive touch panel according to claim 9,
wherein the detection electrode is formed of any one selected from the group consisting of gold, silver, copper, aluminum, indium tin oxide, tin oxide, zinc oxide, cadmium oxide, gallium oxide, titanium oxide, a silver palladium alloy, and a silver palladium copper alloy.

12. The capacitive touch panel according to claim 10,
wherein the detection electrode is formed of any one selected from the group consisting of gold, silver, copper, aluminum, indium tin oxide, tin oxide, zinc oxide, cadmium oxide, gallium oxide, titanium oxide, a silver palladium alloy, and a silver palladium copper alloy.

13. The capacitive touch panel according to claim 1,
wherein a size of the display surface of the display device in a diagonal direction is 5 inches or greater.

14. The capacitive touch panel according to claim 2,
wherein a size of the display surface of the display device in a diagonal direction is 5 inches or greater.

15. The capacitive touch panel according to claim 4,
wherein the difference between the temperature dependence of the relative dielectric constant of the lower pressure sensitive adhesive layer and the temperature dependence of the relative dielectric constant of the upper pressure sensitive adhesive layer is within 5%.

16. The capacitive touch panel according to claim 4,
wherein the capacitive touch panel sensor is a laminate comprising detection electrodes on both surfaces of the substrate or a laminate obtained by sticking substrates with detection electrodes comprising detection electrodes on one surface thereof via a pressure sensitive adhesive layer.

17. The capacitive touch panel according to claim 4,
wherein a size of the display surface of the display device in a diagonal direction is 5 inches or greater.

18. The capacitive touch panel according to claim 6,
wherein the capacitive touch panel sensor is a laminate comprising detection electrodes on both surfaces of the substrate or a laminate obtained by sticking substrates with detection electrodes comprising detection electrodes on one surface thereof via a pressure sensitive adhesive layer.

19. The capacitive touch panel according to claim 6,
wherein a size of the display surface of the display device in a diagonal direction is 5 inches or greater.

20. The capacitive touch panel according to claim 9,
wherein a size of the display surface of the display device in a diagonal direction is 5 inches or greater.

\* \* \* \* \*